(12) United States Patent
Cory et al.

(10) Patent No.: US 9,663,358 B1
(45) Date of Patent: May 30, 2017

(54) PROCESSING QUANTUM INFORMATION

(75) Inventors: David G. Cory, Branchton (CA); Troy W. Borneman, Waterloo (CA); Christopher E. Granade, Sydney (AU)

(73) Assignee: Quantum Valley Investment Fund LP, Waterloo, Ontario (CA)

( * ) Notice: Subject to any disclaimer, the term of this patent is extended or adjusted under 35 U.S.C. 154(b) by 1010 days.

(21) Appl. No.: 13/533,390

(22) Filed: Jun. 26, 2012

Related U.S. Application Data

(60) Provisional application No. 61/509,420, filed on Jul. 19, 2011.

(51) Int. Cl.
  *G06F 15/00* (2006.01)
  *G06F 7/38* (2006.01)
  *G06F 9/00* (2006.01)
  *G06F 9/44* (2006.01)
  *B82Y 10/00* (2011.01)

(52) U.S. Cl.
  CPC .................................. *B82Y 10/00* (2013.01)

(58) Field of Classification Search
  None
  See application file for complete search history.

(56) References Cited

U.S. PATENT DOCUMENTS

| | | | |
|---|---|---|---|
| 7,546,000 B2 | 6/2009 | Spillane et al. | |
| 8,164,082 B2* | 4/2012 | Friesen | 257/9 |
| 2006/0099825 A1* | 5/2006 | Song | B82Y 10/00 438/766 |

OTHER PUBLICATIONS

Kane (A silicon-based nuclear spin quantum computer, May 1998, pp. 133-137).*
Olmschenk (Quantum Teleportation Between Distant Matter Qubits, Jan. 2009, pp. 486-489).*
Yang et al. (Spin-state transfer in laterally coupled quantum-dot chains with disorders, Aug. 2010, pp. 1-10).*
You et al. (Quantum information processing with superconducting qubits in a microwave field, Aug. 2003, pp. 1-7).*
Dutt et al. (Quantum Register Based on Individual Electronic and Nuclear Spin Qubits in Diamond, Jun. 2007, pp. 1312-1315).*

(Continued)

*Primary Examiner* — George Giroux
(74) *Attorney, Agent, or Firm* — Henry Patent Law Firm PLLC

(57) ABSTRACT

A quantum information processor can include a control system and a system of processor nodes. Each of the processor nodes can include multiple qubits and an actuator. The control system can manipulate the qubits of multiple processor nodes based on cross-node quantum interactions between the qubits. In some instances, the control system may perform multi-qubit quantum gates on qubits of different processor nodes based on the cross-node quantum interactions. Within each processor node, the qubits interact with the actuator by an intra-node quantum coupling. Between processor nodes, the actuators interact with each other by an inter-node quantum coupling. The cross-node quantum interaction can be produced by non-commutivity of the intra-node quantum couplings and the inter-node quantum couplings. In some instances, the qubits can be manipulated by applying a control sequence that produces an interaction frame where the cross-node quantum interaction dominates the time evolution of the system.

24 Claims, 7 Drawing Sheets

(56) References Cited

OTHER PUBLICATIONS

Childress et al. (Coherent Dynamics of Coupled Electron and Nuclear Spin Qubits in Diamond, Oct. 2006, pp. 281-284).*
Buluta et al. (Natural and artificial atoms for quantum computation, Feb. 2010, pp. 1-21).*
Wolfgang Harnett, Fullerene-based electron-spin quantum computer; Physical Review A, vol. 65, 0323222; Feb. 27, 2002, 6 pages.
Dieter Suter and Kyungwon Lim, Scalable architecture for spin-based quantum computers with a single type of gate; Physical Review A, vol. 65, 052309, Apr. 24, 2002; 5 pages.
J. Twamley, Quantum-cellular-automata quantum computing with endohedral fullerenes; Physical Review A, vol. 67, 052318; May 30, 2003, 12 pages.
Jonathan Baugh, et al., Solid-state NMR three-quibit homonuclear system for quantum-information processing: Control and characterization; Physical Review A, vol. 73, 022305, Feb. 2, 2006, 10 pages.
Michael Mehring and Jens Mende, Spin-bus concept of spin quantum computing; Physical Review A, vol. 73, 052303, May 4, 2006, 12 pages.
Liang Jiang et al., Distributed quantum computation based on small quantum registers; Physical Review A, vol. 76, 062323, Dec. 26, 2007, 22 pages.
J.S. Hodges, et al., Universal control of nuclear spins via anisotropic hyperfine interactions; Physical Review A, vol. 78, 010303(R), Jul. 8, 2008, 4 pages.
D. Jaksch et al., Fast Quantum Gates for Neutral Atoms; Physical Review Letters, vol. 85, No. 10, Sep. 4, 2000, 4 pages.
J.B. Majer et al., Spectroscopy on Two Coupled Superconducting Flux Qubits; Physical Review Letters, vol. 94, 090501, Mar. 9, 2005, 4 pages.
P. Cappellaro et al., Coherence and Control of Quantum Registers Based on Electronic Spin in a Nuclear Spin Bath; Physical Review Letters, vol. 102, 210502, 4 pages, 2009.
A. Bermudez et al., Electron-Mediated Nuclear-Spin Interactions between Distant Nitrogen-Vacancy Centers; Physical Review Letters, vol. 107, 150503, Oct. 3, 2011, 5 pages.
A. Bermudez et al., Electron-Mediated Nuclear-Spin Interactions between Distant NV Centers; obtained from the Internet: xxx.lanl.gov/archive/quant-ph, dated Jul. 13, 2011, 9 pages.
W. Harneit et al., Architectures for a Spin Quantum Computer Based on Endohedral Fullerenes; Phys. Stat. sol. (b) 233, No. 3, Jul. 30, 2002; pp. 453-461.
L. M. Duan and C. Monroe, Colloquium: Quantum networks with trapped ions; Reviews of Modern Physics, vol. 82, Apr.-Jun. 2010; Apr. 28, 2010; 16 pages.
M. Saffman et al., Quantum information with Rydberg atoms; Reviews of Modern Physics, vol. 82, Jul.-Sep. 2010; Aug. 18, 2010, 51 pages.
K-A Brickman Soderberg and C. Monroe, Phonon-mediated entanglement for trapped ion quantum computing; Reports on Progress in Physics, vol. 73, 036401, Feb. 23, 2010, 24 pages.
Seth Lloyd, A Potentially Realizable Quantum Computer; Science, vol. 261, Sep. 17, 1993, pp. 1569-1571.
J.R. Petta et al., Coherent Manipulation of Coupled Electron Spins in Semiconductor Quantum Dots; Science vol. 309, Sep. 30, 2005, pp. 2180-2184.

D.G. Cory et al., NMR Based Quantum Information Processing: Achievements and Prospects; Fortschr. Phys. vol. 48, (2000) 09-11; pp. 875-907.
Andreas Heidebrecht, Jens Mende, and Michael Mehring; Fortschr. Phys., vol. 54, No. 8-10, Aug. 4, 2006, pp. 788-803.
Evan M. Fortunato et al., Design of strongly modulating pulses to implement precise effective Hamiltonians for quantum information processing; Journal of Chemical Physics; vol. 116, No. 17, May 1, 2002, pp. 7599-7606.
Dieter Suter and T.S. Mahesh, Spins as quibits, Quantum information processing by nuclear magnetic resonance; Journal of Chemical Physics, vol. 128, 052206, Feb. 5, 2008, 14 pages.
J.A. Jones and E. Knill, Efficient Refocusing of One-Spin and Two-Spin Interactions for NMR Quantum Computation; Journal of Magnetic Resonance, vol. 141, Jul. 20, 1999, pp. 322-325.
Navin Khaneja et L., Optimal control of coupled spin dynamics: design of NMR pulse sequences by gradient ascent algorithms; Journal of Magnetic Resonance, vol. 172, Dec. 2, 2005; pp. 296-305.
Troy W. Borneman, Application of optimal control of CPMG refocusing pulse design; Journal of Magnetic Resonance, vol. 207, Sep. 15, 2010, pp. 220-233.
Eric Hoffman, et al., Primary Nuclear Spin Echoes in EPR Induced by Microwave Pulses; Journal of Magnetic Resonance, Series A117, Mar. 16, 1995, pp. 16-27.
Jörg Wrachtrup and Fedor Jelezko, Processing quantum information in diamond; Journal of Physics: Condensed Matter, Matter 18, May 12, 2006, pp. s807-s824.
B.E. Kane, A silicon-based nuclear spin quantum computer, Nature, vol. 393, May 14, 1998, pp. 133-137.
D. Kielpinski et al., Architecture for a large-scale ion-trap quantum computer; Nature, vol. 417, Jun. 13, 2002, pp. 709-711.
J. Majer et al., Coupling superconducting qubits via a cavity bus; Nature, vol. 449, Sep. 27, 2007, pp. 443-447.
John J.L. Morton et al., Solid-state quantum memory using the $^{31}P$ nuclear spin; Nature, vol. 455, Oct. 23, 2008, pp. 1085-1088.
U. Haeberlen and J.S. Waugh, Coherent Averaging Effects in Magnetic Resonance; Physical Review, vol. 175, No. 2, Nov. 10, 1968, 15 pages.
Viswanath Ramakrishna et al., Controllability of molecular systems; Physical Review A, vol. 51, No. 2, Feb. 1995, pp. 960-966.
Daniel Loss and David P. DiVencenzo, Quantum computation with quantum dots; Physical Review A, vol. 57, No. 1, Jan. 1998; pp. 120-126.
S.G. Schirmer, H. Fu, and A.I. Solomon, Complete controllability of quantum systems; Physical Review A, vol. 63, 063410, May 15, 2001, 8 pages.
A. Abragam, Principles of Nucelar Magnetism, Oxford Univeristy Press, USA, Oct. 1983, 4 pages.
D.P. DiVincenzo et al., Universal quantum computation with the exchange interaction. Nature, 408 (6810): Nov. 2000, pp. 339-342.
John Preskill. Lecture notes from physics 229: Quantum information and computation, Sep. 1998, 321 pages.
Ardavan et al., Manipulation of quantum information inN@C60 using electron and nuclear magnetic resonance. Physical status solidi (b), 244(11): 3874-3878, Nov. 2007.
Simon C. Benjamin et al., Towards a fullerene-based quantum computer. Journal of Physics: Condensed Matter, 18(21), pp. S867-S883, May 2006.

* cited by examiner

PROCESSING QUANTUM INFORMATION

CROSS-REFERENCE TO RELATED APPLICATIONS

This application claims the benefit of U.S. Provision Application No. 61/509,420, filed Jul. 19, 2011, entitled "Processing Quantum Information," the entire disclosure of which is incorporated by reference herein.

BACKGROUND

This specification relates to processing quantum information. A variety of quantum information processing devices have been proposed. Such devices typically encode information in the state of a quantum system and utilize the dynamics of the quantum system to process the encoded information. In some contexts, such devices can execute computing tasks by controlling, manipulating, or otherwise utilizing the quantum dynamics of the system. In addition, quantum information processors may implement techniques to correct errors or counteract noise processes (e.g., decoherence, etc.) affecting the quantum system.

SUMMARY

In a general aspect, cross-node quantum interactions are used to process information in a node-based quantum information processor. A cross-node quantum interaction can include an interaction between qubits of different processor nodes. The cross-node quantum interactions may be used, for example, to perform multi-qubit logic gates.

In some aspects, a quantum information processor includes a first processor node, a second processor node, and a control system. The first processor node includes a first qubit and a first actuator. The first qubit is coupled to the first actuator by a first quantum coupling. The second processor node includes a second qubit and a second actuator. The second qubit is coupled to the second actuator by a second quantum coupling, and the second actuator is coupled to the first actuator by a third quantum coupling. The control system is operable to manipulate the first and second qubits based on a cross-node quantum interaction between the first qubit and the second qubit. The cross-node quantum interaction is produced by non-commutivity of the first and third quantum couplings and non-commutivity of the second and third quantum couplings.

Implementations of these and other aspects may include one or more of the following features. The first processor node includes a third qubit coupled to the first actuator by a fourth quantum coupling. The second processor node includes a fourth qubit coupled to the second actuator by a fifth quantum coupling. The control system is operable to manipulate the third qubit and the fourth qubit based on an additional cross-node quantum interaction between the third qubit and the fourth qubit. The additional cross-node quantum interaction is produced by non-commutivity of the fourth and third quantum couplings and non-commutivity of the fifth and third quantum couplings. The control system is operable to induce both of the cross-node quantum interactions, including in parallel or in another manner (e.g., non-parallel, etc.).

Additionally or alternatively, implementations of these and other aspects may include one or more of the following features. The control system is operable to manipulate the first and second qubits by applying control operations to the actuators. The control operations define an interaction frame in which the cross-node quantum interaction between the first qubit and the second qubit dominates the dynamics of the respective first and second qubits. The control system is operable to suppress other interactions of the respective first and second qubits.

Additionally or alternatively, implementations of these and other aspects may include one or more of the following features. The first quantum coupling $H_1$ commutes with the second quantum coupling $H_2$, and the control system is operable to induce the cross-node quantum interaction from an effective coupling term $[[H_3, (H_1+H_2)], (H_1+H_2)]$, where $H_3$ represents the third quantum coupling. The third quantum coupling includes a dipolar coupling between the first actuator and the second actuator. The first quantum coupling includes a first hyperfine coupling between the first qubit and the first actuator. The second quantum coupling includes a second hyperfine coupling between the second qubit and the second actuator. The cross-node quantum interaction includes an effective dipolar interaction between the first qubit and the second qubit in an interaction frame.

Additionally or alternatively, implementations of these and other aspects may include one or more of the following features. The first qubit is a first nuclear spin, the second qubit is a second nuclear spin, the first actuator is a first electron, and the second actuator is a second electron. The control system is operable to apply a microwave field to the first and second electrons to induce the cross-node quantum interaction that manipulates the first and second qubits. The control system is operable to apply a microwave field to the first and second electrons that suppresses other quantum interactions between the first processor node and the second processor node.

Additionally or alternatively, implementations of these and other aspects may include one or more of the following features. The first actuator can be the only actuator of the first processor node, and the second actuator can be the only actuator of the second processor node. The first actuator and the second actuator may each include one or more additional actuators.

In some aspects, information is encoded in the first processor node and the second processor node. The information is processed using the cross-node quantum interaction between the first qubit and the second qubit. A result of processing the information is detected.

Implementations of these and other aspects may include one or more of the following features. Processing the information includes performing a multi-qubit quantum gate on the first qubit and the second qubit. Processing the information includes applying control operations to the first and second processor nodes. The control operations define an interaction frame in which the cross-node quantum interaction between the first qubit and the second qubit dominates the dynamics of the respective first and second qubits. The control operations include an electromagnetic field applied to the first and second actuators.

In some aspects, a quantum information processor includes a node system and a control system. The node system includes a plurality of processor nodes. Each of the processor nodes includes a qubit and an actuator. The control system is operable to perform a multi-qubit quantum gate based on a cross-node quantum interaction between the qubits of different processor nodes. The cross-node quantum interaction between the qubits of different processor nodes are produced by non-commutivity of intra-node quantum couplings between the qubit and the respective actuator of each processor node and inter-node quantum couplings between the actuators of the different nodes.

Implementations of these and other aspects may include one or more of the following features. The processor nodes each include a plurality of qubits, and the control system is operable to perform a universal set of quantum gates based on cross-node quantum interactions between the qubits of different processor nodes. The control system is operable to perform a quantum algorithm that includes the multi-qubit quantum gate and other operations. The control system is operable to encode information in a quantum state of the qubits. The control system is operable to detect information encoded in a quantum state of the qubits.

Additionally or alternatively, implementations of these and other aspects may include one or more of the following features. The control system is operable to perform the multi-qubit quantum gate by modulating only the actuators. The actuators define multiple manifolds. The manifolds include a computational manifold that defines computational states of the qubits. One or more ground states of the actuators can provide the computational manifold. The cross-node quantum interaction can be induced by one or more excited states of the actuators. The control system is operable to perform the multi-qubit quantum gate by generating a transition between the ground state and excited states.

The details of one or more implementations are set forth in the accompanying drawings and the description below. Other features, objects, and advantages will be apparent from the description and drawings, and from the claims.

DETAILED DESCRIPTION

Figure 1A:
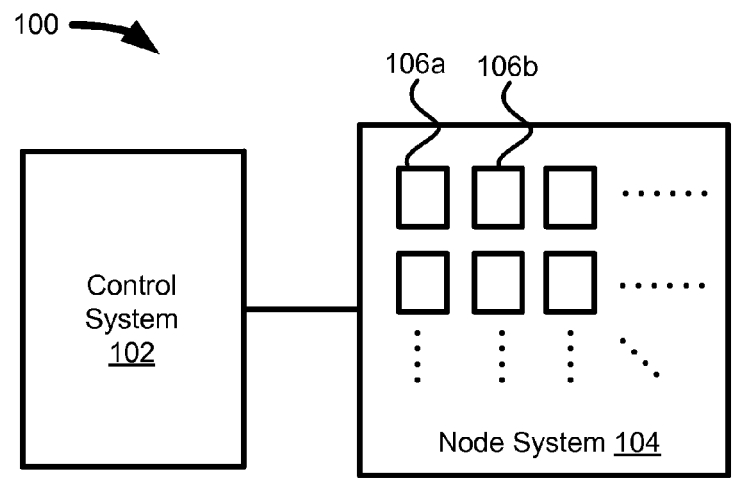
FIG. 1A is a schematic diagram showing an example quantum information processor.

The present disclosure describes, among other things, systems and techniques for coupling quantum bits ("qubits") of different processor nodes in a node-based quantum information processor. In some instances, an effective channel for information transfer between qubits of different processor nodes can be obtained by manipulating the system in an interaction frame where the qubits interact through a dipolar interaction or exchange interaction between actuator elements of the different processor nodes. In some instances, the qubit interactions can be controlled by modulating only the actuators. Such control techniques may permit more efficient and more robust implementations of cross-node quantum gates, which in some cases, may include a universal set of quantum gates. In some instances, the control techniques can be executed independent of, or nearly independent of, actuator decoherence. In some cases, the control techniques may be made insensitive to experimental variations of system parameters, for example, by appropriate design of robust control sequences.

A distributed, multi-node structure can provide a convenient and useful arrangement of qubits for quantum information processing. Such an arrangement can be implemented, for example, as an array of disjoint local quantum processor nodes that can each be controlled locally. Communication between the qubits of different local processor nodes can be achieved, for example, by coupling between the processor nodes. In some node-based quantum information processing systems, couplings between the nodes can be turned "on" or "off" or otherwise manipulated to control the communication between processor nodes. Local control of the individual processor nodes and communication between the processor nodes can be achieved, in some instances, by including an actuator element in each processor node. In some examples, the actuator element of each node is coupled by an exchange interaction or dipolar interaction to the actuator elements of other nodes (e.g., nearest-neighbor nodes, or another subset of nodes). Cross-node actuator couplings may be used, in some implementations, to generate a universal set of gates between any pair of qubits in different processor nodes.

In some instances, information may be efficiently and robustly transferred between disjoint local quantum processors in a distributed node quantum information processor. For example, an effective communication channel can be created between processor nodes by manipulating the actuator interactions between the processor nodes. The effective channel may allow the parallel transfer of multiple-qubit states between processor nodes. For example, an induced cross-node interaction channel may be used to swap the complete quantum states of the qubits in two processor nodes in parallel. In some examples, the channel takes the form of a series of multi-body interactions in the zero-quantum manifold of anti-symmetric actuator states. The information channel created by the multi-body interactions can be transferred to the computational manifold of the actuator ground state, for example, by manipulating the actuator states. The resulting coupling network may be used to generate gate operations between nodes. In some instances, the cross-node information channel may be induced without individually addressing each node, and information can be transferred between several nodes at once. For example, for more than two nodes, the channel may take the form of a series of multi-body interactions in the manifold of actuator states corresponding to single excitations of any actuator element.

FIG. 1A is a schematic diagram showing an example quantum information processor 100. The example quantum information processor 100 shown in FIG. 1A includes a control system 102 and a node system 104. A quantum information processor may include additional or different features and components. The node system 104 includes multiple processor nodes. For purposes of illustration, six example processor nodes are shown in FIG. 1A, and two individual processor nodes 106a and 106b are labeled. A node system 104 may generally include any number of processor nodes in any suitable arrangement. Moreover, the discussion of processor nodes 106a and 106b can be applied to any pair of processor nodes in the node system 104.

The control system 102 can interact with the node system 104 to perform quantum information processing tasks. For example, the control system 102 may encode or store information in the node system 104, the control system 102 may control or manipulate the dynamics of the node system 104, or the control system 102 may initialize and detect or read the state of qubits in the node system 104. The control system 102 may interact with the node system 104 in any suitable manner, as appropriate for the particular computing architecture and system modality.

Figure 1B:
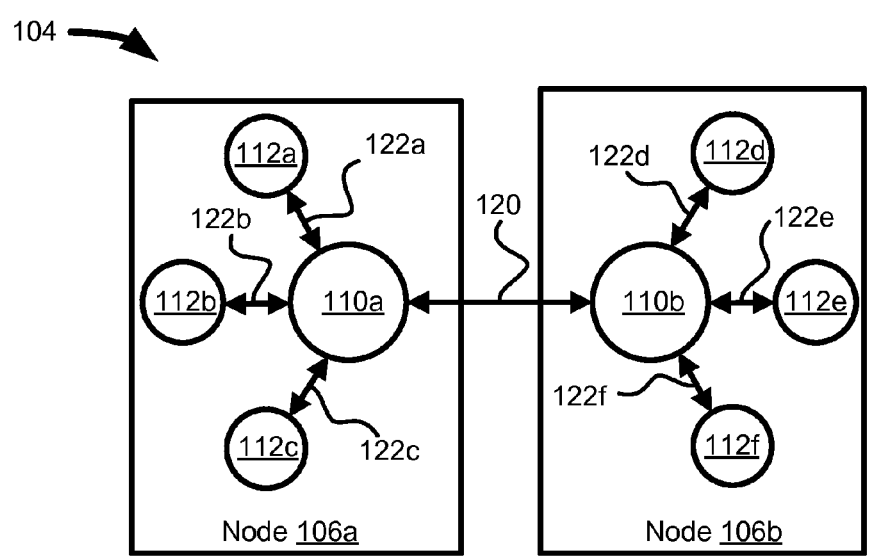
FIG. 1B is a schematic diagram showing example nodes of the quantum information processor 100 of FIG. 1A.
Figure 2:
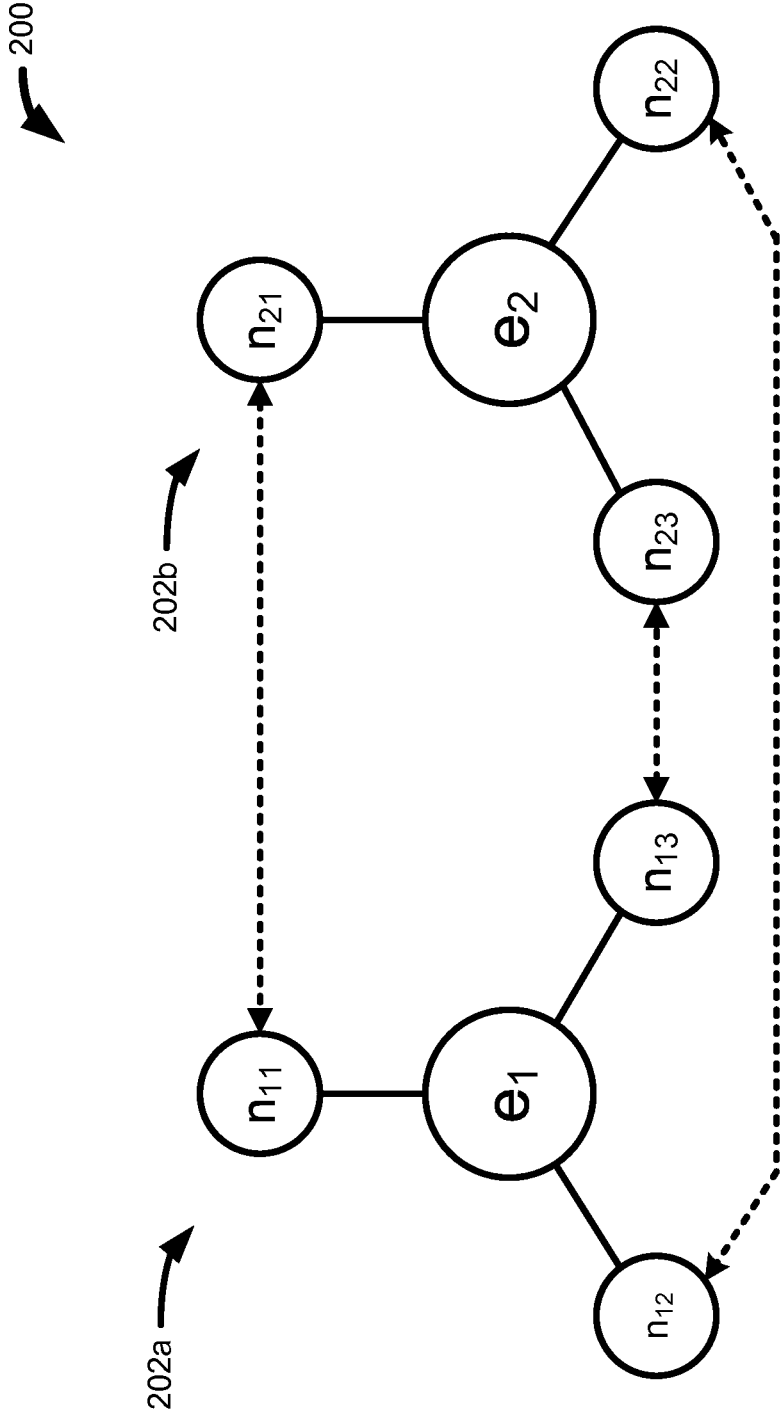
FIG. 2 is a schematic diagram showing example nodes in an electron-nuclear spin system.
Figure 4:
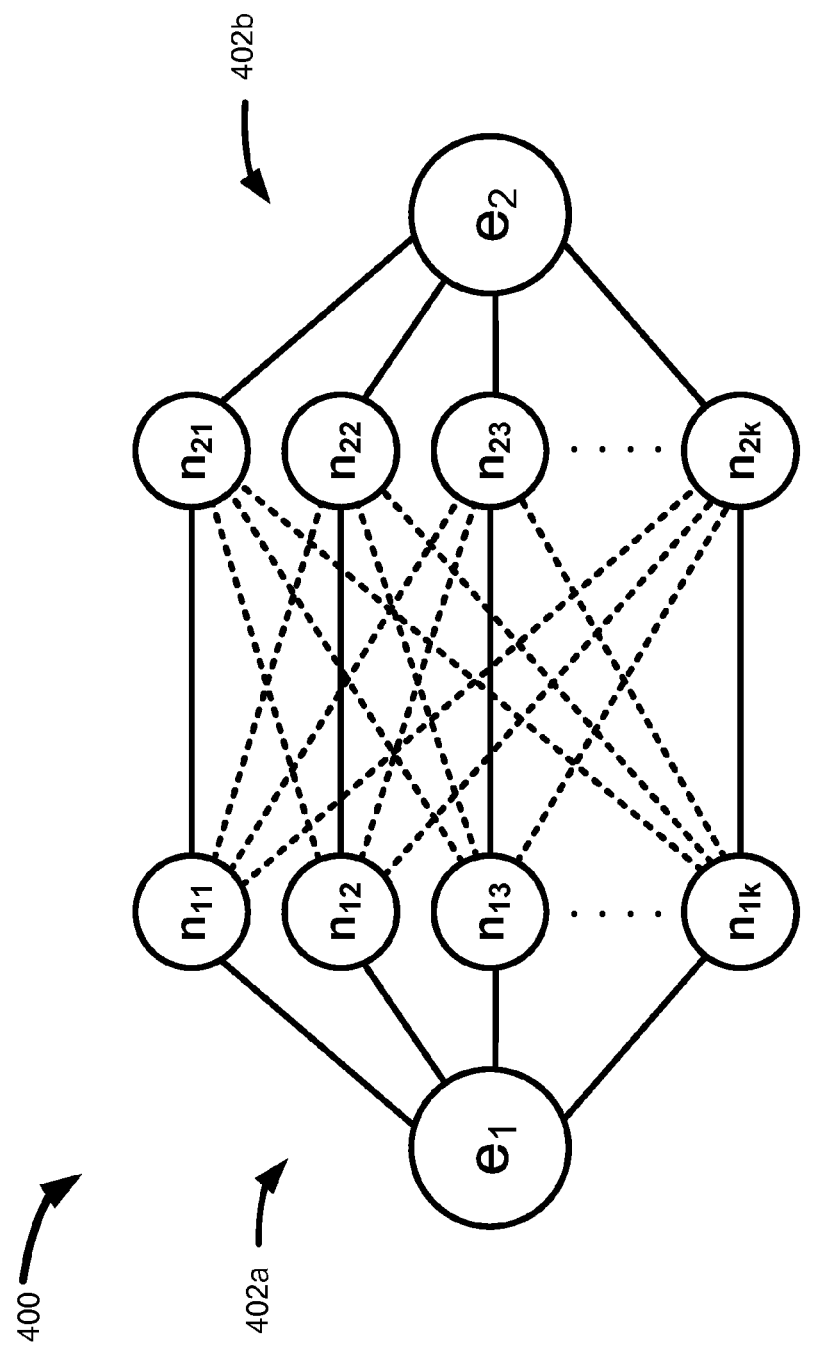
FIG. 4 is a schematic diagram showing example cross-node quantum interactions between nodes of a quantum information processor.

The processor nodes can be arranged according to any suitable structure or architecture. In some examples, the processor nodes can be arranged as an array or lattice structure. In the example quantum information processor 100 shown in FIG. 1A, the processor nodes each include one or more qubits and one or more actuators. The processor nodes can include additional or different features, as appropriate. Some example node systems are shown in FIGS. 1B, 2, and 4.

As an example, the node system 104 can be implemented as an electron-nuclear spin system, where each of the processor nodes includes one or more nuclear spins and one or more electron spins. In some implementations, the nuclear spins of each processor node serve as qubits to store quantum information, and the electron spins of each processor node serve as actuators to control the qubits. The processor nodes may be arranged within a solid-state crystal lattice or another type of structured array. For example, a Langmuir-Blodgett film or other self-assembled or patterned two-dimensional array of molecules may be used. The node system 104 can be implemented in any other suitable quantum information processing modality. For example, a node system for quantum information processing may be implemented by Rydberg atom excitations of neutral atoms, inductive coupling of superconducting qubits, Bloch wave dispersion in cavity devices, semiconductor quantum dots, nitrogen-vacancy defect centers in diamond, and others. An example architecture could include an array of superconducting qubits, acting as actuators, each coupled via a dipolar interaction to a number of qubits which could include nuclear spins, electron spins, or additional superconducting qubits. The dipolar coupling could result from the dipole moment of a superconducting qubit, generated by a persistent current loop, interacting with the natural dipole moments of nuclear or electron spins, or with the persistent current dipole moments of other superconducting qubits. Interactions between superconducting qubit actuators could be provided directly by the interaction of the respective dipole moments, or by mutual coupling to a resonator bus. Other architectures may be used.

In some implementations, the qubits within an individual processor node can interact with each other. For example, the qubits within an individual processor node may be coupled directly to each other by a direct quantum coupling. As another example, the qubits within an individual processor node may be coupled to each other indirectly through an intermediate qubit or an actuator in the same processor node. In some implementations, the processor nodes are arranged as disjoint local quantum processors. For example, the distance between the processor nodes, or other features of the node system 104, may render direct coupling between qubits of different nodes negligible. As such, the actuators may provide the only communication path between the qubits of different processor nodes.

The actuators of the processor nodes can provide coupling among the processor nodes of the node system 104. In some instances, the actuator of one processor node can be coupled to the actuators of one or more other processor nodes. For example, the processor nodes may be arranged in an array structure, where the actuator of each processor node is coupled to the actuator of its nearest neighbor processor nodes. In some implementations, the coupling between individual pairs of processor nodes can be controlled by the control system 102. For example, the control system 102 may induce coupling between an individual pair of processor nodes to perform a cross-node operation, or the control system 102 may induce coupling among multiple pairs of processor nodes to perform multiple cross- node operations in parallel. As another example, the control system 102 may suppress coupling between individual pairs of processor nodes, or the control system 102 may suppress coupling among all processor nodes.

The qubits and actuators can be implemented by an suitable quantum mechanical systems or subsystems. For example, qubits, actuators, or both, can be implemented as nuclear spins, electron spins, atomic spins, electronic energy states, Josephson junctions, quantum dots, and others, as appropriate. In some implementations, each of the qubits can store one quantum bit of information. For example, each individual qubit can assume a quantum state that can be represented as one of two computational basis states $|0\rangle$ and $|1\rangle$ or any superposition of the two computational basis states $|0\rangle$ and $|1\rangle$. The quantum information processor 100 can store information in the collective state of the qubits in the node system 104. The combination of qubits in the node system 104 can define a Hilbert space, and the state of the qubits can be represented by a density matrix. As an example, an n-qubit quantum information processor can have $2^n$ computational basis states, and the collective state of the n-qubits can be represented by a $2^n \times 2^n$ dimensional density matrix.

In some implementations, the computational basis states of the quantum information processor 100 are defined in a particular state, or a particular subset of states, of the actuators. For example, when the ground state manifold of the actuators is used for quantum information processing, the actuators are in their collective ground state for all of the computational basis states. Additional or different actuator manifolds may be used as the computational manifold. The computational manifold may be selected based on decoherence rates, constraints or features of the control system 102, and other properties of the quantum information processor 100. For example, the ground state actuator manifold may be selected as the computational manifold based on its slower decoherence rates, or other considerations.

In some implementations, the actuator states that do not include computational basis states can be used as a bus manifold to induce cross-node quantum interactions. For example, when the ground state manifold of the actuator is used for quantum information processing, one or more excited states of the actuators may be used to induce coupling between qubits in different processor nodes. In some example systems, the zero-quantum actuator manifold provides a four-body coupling among the qubits and actuators in different nodes, and the four-body coupling can be converted to an effective two-body coupling between the qubits under an appropriate control sequence applied by the control system 102.

The control system 102 can include any suitable structures, hardware, software, apparatus, or combinations thereof. The control system 102 may include hardware configured to interact with the quantum degrees of freedom of the node system 104. For example, the control system 102 may include coils, magnets, cavities, electrodes, optics, current or charge sensors, or other components configured to interact with the qubits, the actuators, or other aspects of the processor nodes. The control system 102 may also include chambers, pumps, motors, cryogenic systems, or any other suitable combination of these and other hardware components, which may be controlled by external computing systems, to control temperatures, pressures, positions, orientations, or other physical conditions of the node system 104.

In some implementations, the control system 102 is configured to interact with the node system 104 by applying electromagnetic fields or pulses to the node system 104. The electromagnetic fields or pulses can include static fields or pulses, spatially-varying fields or pulses, time-varying fields or pulses, or a combination of these and any other suitable electromagnetic interactions. The fields or pulses may include radio frequencies, microwave frequencies, optical frequencies, or any suitable combination of these and other frequencies. For example, in some cases, radio frequency fields can be applied to interact with nuclear spin states, microwave fields can be applied to interact with electron spin states, optical fields can be applied to interact with atomic electronic states, etc. The fields or pulses may be produced and applied to the node system 104 by conventional hardware, such as, for example, nuclear magnetic resonance probes, electron spin resonance probes, superconducting magnets, electromagnets, optics, or any other suitable hardware.

In some cases, parameters of the electromagnetic fields or pulses can be calculated or otherwise generated by a (classical) computer running software. For example, the parameters of the fields or pulses may be optimized or otherwise selected based on numerical simulations. In some cases, electromagnetic control sequences applied to the node system 104 include composite pulses, pulses designed based on optimal control theory, shaped pulses, strongly modulating pulses, or other types of pulses.

In some implementations, the control system 102 can be configured to interact with both the qubits and the actuators. For example, if the processor nodes are implemented as an electron-nuclear spin system, the control system 102 may manipulate the node system 104 using radio frequency pulses that modulate the nuclear spins and microwave pulses that modulate the electron spins. The radio frequency pulses may be applied to the nuclear spins, for example, using well-known nuclear magnetic resonance hardware, or other types of hardware, as appropriate. The microwave pulses may be applied to the electron spins, for example, using well-known electron spin resonance hardware, or other types of hardware, as appropriate. In some instances, universal control over the processor nodes can be achieved via actuator-only modulation by the control system 102. For example, in some cases where the processor nodes are implemented as an electron-nuclear spin system, the control system 102 may manipulate both the nuclear spins and the electron spins by applying microwave pulses that modulate only the electron spins.

In some implementations, the control system 102 is configured to detect properties of the node system 104. For example, the control system 102 may be configured to detect electromagnetic signals produced by the node system 104. In some cases, the node system 104 is configured to detect radio frequency signals produced by excited states of nuclear spins, microwave signals produced by excited states of electron spins, photons produced by excited atomic states, or other types of electromagnetic interactions. The control system 102 may be configured to detect or infer properties of the quantum state of the qubits based on the interaction with the node system 104.

FIG. 1B is a schematic diagram showing example processor nodes 106a and 106b of the quantum information processor 100 of FIG. 1A. In the example shown in FIG. 1B, the processor nodes 106a and 106b each include one actuator and three qubits. Processor nodes may include a different number of actuators or a different number of qubits, or both, as appropriate. Each of the processor nodes may generally include any suitable number of qubits and actuators, as appropriate. All of the processor nodes in a given quantum information processor can have the same number of qubits, or the individual processor nodes may have different numbers of qubits. As an example, some of the processor nodes in the node system 104 may have one or two qubits while others have three qubits.

As shown in FIG. 1B, the processor node 106a includes an actuator 110a and three qubits 112a, 112b, and 112c, and the processor node 106b includes another actuator 110b and three other qubits 112d, 112e, and 112f. The qubits 112a, 112b, and 112c of the processor node 106a are each coupled to the actuator 110a by respective intra-node quantum couplings 122a, 122b, and 122c. The intra-node quantum couplings 122a, 122b, and 122c can be 112a, $110a_5$ yf 112b, $110a_{and}$ $y_f$ 112c, $110a_5$ represented as lab frame Hamiltonians $H^{112a,\ 110a}$, $H^{112b,\ 110a}$ and $H^{112c,\ 110a}$, respectively. The qubits 112d, 112e, and 112f of the processor node 106b are each coupled to the actuator 110b by respective intra-node quantum couplings 122d, 122e, and 122f. The intra-node quantum couplings 122d, 122e, and 122f can be represented as lab frame Hamiltonians $H^{112d,\ 110b}$, $H^{112e,\ 110b}$ and $H^{112f,\ 110b}$, respectively. The actuators 110a and 110b of the different processor nodes 106a and 106b are coupled to each other by the inter-node quantum coupling 120, which may be represented as lab frame Hamiltonian $H^{110a,\ 110b}$. The qubits and the actuators of each processor node may experience additional or different quantum couplings. For example, the qubits in a given processor node may be coupled to one or more other qubits in the same processor node.

In some implementations, the intra-node quantum couplings within a processor node do not commute with the actuator's inter-node quantum couplings. The commutator of two quantum operators A and B is provided by the equation [A, B]=AB−BA. Two quantum operators A and B are said to be commuting operators when their commutator is zero, i.e., [A, B]=0. Two quantum operators A and B are said to be non-commuting operators when their commutator is non-zero, i.e., [A, B]≠0. In the example processor nodes 106a and 106b shown in FIG. 1B, the intra-node quantum couplings 122a, 122b, 122c, 122d, 122f, and 122e do not commute with the inter-node quantum coupling 120. The non-commutivity of these inter-node quantum couplings and intra-node quantum couplings may be expressed as $[H^{112a,\ 110a}, H^{110a,\ 110b}]\neq 0$, $[H^{112b,\ 110a}, H^{110a,\ 110b}]\neq 0$, $[H^{112c,\ 110a}, H^{110a,\ 110b}]\neq 0$, $[H^{112d,\ 110b}, H^{110a,\ 110b}]\neq 0$, $[H^{112e,\ 110b}, H^{110a,\ 110b}]\neq 0$, and $[H^{112f,\ 110b}, H^{110a,\ 110b}]\neq 0$.

In some cases, the processor nodes 106a and 106b can be implemented in an electron-nuclear spin system, where the actuators 110a and 110b are electrons and the qubits 112a, 112b, 112c, 112d, 112e, and 112f are nuclear spins. In this example, the intra-node quantum couplings between the nuclear spins and the actuator within a given processor node are given by the hyperfine interaction $H_{hf}^{e-n}$, and the inter-node quantum coupling between the actuators of different processor nodes is given by the dipolar interaction $H_D^{e-e}$. Because $[H_{hf}^{e-n}, H_D^{e-e}]\neq 0$, the dipolar and hyperfine interactions have the property of non-commutivity.

The non-commutivity of the inter-node quantum couplings and intra-node quantum couplings can be used to induce cross-node quantum interactions between the qubits of different nodes. In some instances, the non-commutivity produces four-body terms in the effective Hamiltonian of the node system 104, and the four-body terms can provide an effective coupling among qubits and actuators of different nodes. For example, non-commutivity of the quantum couplings 122a and 120 and non-commutivity of the quantum couplings 122d and 120 may produce an effective Hamiltonian with a four-body term that operates on the qubits 112a and 112d and the actuators 110a and 110b.

In some implementations, the control system 102 can convert the four-body term into an effective two-body interaction between the qubits in an interaction frame. In the electron-nuclear spin system example, the control system 102 may apply a microwave field to the electrons. The microwave field may provide an interaction frame where the four-body term that operates on the qubits 112a and 112d and the actuators 110a and 110b appears as a two-body term that operates on the qubits 112a and 112d. In some cases, the effective two-body interaction dominates the time-evolution of the qubits in the interaction frame. For example, the microwave field, or other control operations applied by the control system 102, may suppress or counteract other interactions of the qubits 112a and 112d.

In some cases, the cross-node quantum interactions produced by non-commutivity of the inter-node quantum couplings and intra-node quantum couplings can be used for quantum information processing. For example, the effective two-body term that operates on the qubits 112a and 112d in the interaction frame can be used to perform a two-qubit quantum gate (e.g., controlled-not, controlled-phase, swap, etc.) on the two qubits 112a and 112d. Moreover, cross-node quantum interactions between multiple different pairs of qubits can be induced simultaneously. For example, the states of the qubits 112a, 112b, and 112c can be simultaneously swapped with the respective states of the qubits 112d, 112e, and 112f in parallel.

Figure 1C:
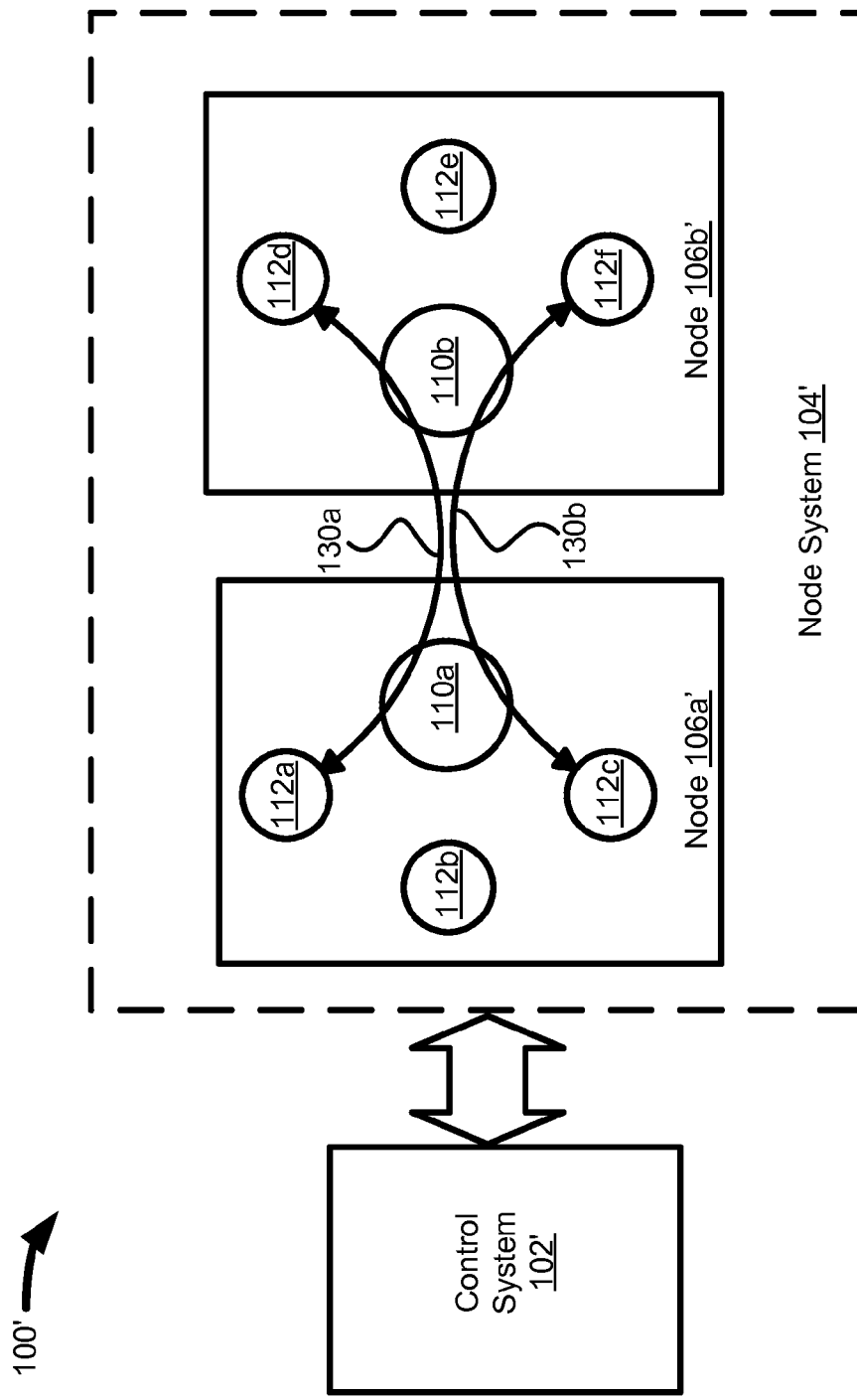
FIG. 1C is a schematic diagram showing example cross-node quantum interactions in a quantum information processor.

FIG. 1C is a schematic diagram showing example cross-node quantum interactions in the quantum information processor 100', which represents the quantum information processor 100 of FIG. 1A in a state of operation. In particular, FIG. 1C shows an example where the control system 102' operates on the node system 104' to introduce two effective parallel cross-node quantum interactions 130a and 130b. The cross-node quantum interactions 130a and 130b can be represented as evolution under interaction frame Hamiltonians $H_{int}^{112a, 112d}$ and $H_{int}^{112c, 112f}$, respectively.

Given a Hamiltonian composed of multiple terms, an interaction frame is used to isolate the effect of one or more terms of the Hamiltonian that are particularly interesting. For example, given $H=H_A+H_B$, we may move into an interaction frame of $H_A$ that isolates the dynamics of $H_B$ by defining $\tilde{H}(t)=e^{-iH_At}He^{iH_At}-H_A=\tilde{H}_B(t)$ where $\tilde{H}_B(t)=e^{-iH_At}H_Be^{iH_At}$. When $H_A$ and $H_B$ are commuting, i.e. $[H_A, H_B]=0$, the interaction frame Hamiltonian is simply $\tilde{H}(t)=H_B$. Often, when $H_A$ and $H_B$ are non-commuting, i.e. $[H_A, H_B]\neq 0$, the time-dependent portions of $\tilde{H}(t)$ are dropped in a secular approximation.

In some implementations, an interaction frame can be used to produce an effective cross-node qubit interaction. For example, the non-commutivity of the lab-frame 112a, 110a ₃1·110a, 110b $_{and\,31}$412d,110b Hamiltonians, may give rise to four-body coupling terms among the actuators 110a and 110b and the qubits 112a and 112d in the lab frame represented in FIG. 1B. In the interaction frame corresponding to operation of the control system 102' in FIG. 1C, the four-body coupling terms may appear as two-body inter-node coupling terms between the qubits 112a and 112d. The two-body inter-node coupling terms in the interaction frame can create an effective cross-node qubit interaction. Examples are described below with respect to FIGS. 2, 3, and 4.

Expanding this concept across the full node system 104, an effective cross-node processor coupling network can be created by moving into an interaction frame where naturally occurring four-body coupling terms between cross-node actuator and processor elements within a manifold of excited states unused for quantum information storage appear as two-body couplings between every pair of cross-node processor qubits in an appropriate computational manifold. This complete cross-node coupling network may allow for a universal set of operations between nodes.

FIG. 2 is a schematic diagram showing example nodes in an electron-nuclear spin system 200. The example electron-nuclear spin system 200 includes two processor nodes 202a, 202b, and each of the nodes includes a single electron spin and three nuclear spins. Additional or different types of processor nodes may be used in a quantum information processor. This example electron-nuclear spin system contains the physics that illustrate some aspects of cross-node quantum interactions in a node-based quantum information processor architecture. Cross-node quantum interactions can be used in many other types of quantum information processors. For example, Rydberg atom excitations of neutral atoms, inductive coupling of superconducting qubits, and Bloch wave dispersion in cavity devices all take the form of an isotropic dipolar coupling. Direct dipolar interactions also naturally occur in spin-based devices such as semiconductor quantum dots, silicon-based devices, nitrogen-vacancy defect centers in diamond, and solid-state spin systems. The concepts described here can be applied to these other types of proposed quantum computing architectures.

In some example spin-based quantum information processor architectures, each processor node includes an electron-actuator spin coupled via resolved anisotropic hyperfine interactions to each of k qubits of a local nuclear spin processor. The local nuclear spin processor includes k nuclear spins that serve as the qubits of the processor node. Generally, the processor nodes can include any suitable number of nuclear spins. In the example electron-nuclear spin system 200 shown in FIG. 2, each of the processor nodes 202a and 202b include three nuclear spins (k=3).

The intra-node quantum couplings within each processor node include a hyperfine coupling between the electron spin and each of the nuclear spins. The inter-node quantum couplings between the processor nodes 202a and 202b includes a dipolar coupling between the electron spins. In some instances, the difference of the hyperfine coupling strengths are larger than the electron dipolar coupling strengths. The control techniques described here can be adapted to the particular inter-node and intra-node couplings in other types of node-based processor systems. For example, Rydberg atom excitations of neutral atoms, inductive coupling of superconducting qubits, and Bloch wave dispersion in cavity devices all take the form of an isotropic dipolar coupling. Direct dipolar interactions also naturally occur in spin-based devices such as semiconductor quantum dots, silicon-based devices, nitrogen-vacancy defect centers in diamond, and other solid-state spin systems. The control techniques may be readily extended to these systems.

A control system of the quantum information processor may interact with the actuators (the electron spins in the example electron-nuclear spin system 200), the qubits (the nuclear spins in the example electron-nuclear spin system 200), or both. In some instances, control over the processor nodes can be achieved via actuator-only modulation; this may be accomplished by taking advantage of the relative strength of the anisotropic hyperfine interaction to affect a universal set of fast quantum gates on the nuclear spins. For example, the control system 102 may execute a universal set of quantum gates on the node system 104 by modulating only the electrons of each processor node. In such instances, quantum algorithms may be implemented without directly modulating the nuclear spins with radio frequency control fields. The nuclear spins may serve as storage elements for quantum information, given their relatively long coherence times. The inter-node coupling of actuators can be provided by an isotropic dipolar interaction between electrons. Alternatively, the inter-node coupling of actuators can be provided by an exchange interaction between electrons. The processor nodes can be disjoint, where the spatial separation between the processor nodes is large enough to render inter-node dipolar interactions between nuclear spins negligible. In some implementations, node separation of roughly 1 nm may be sufficient.

Figure 3:
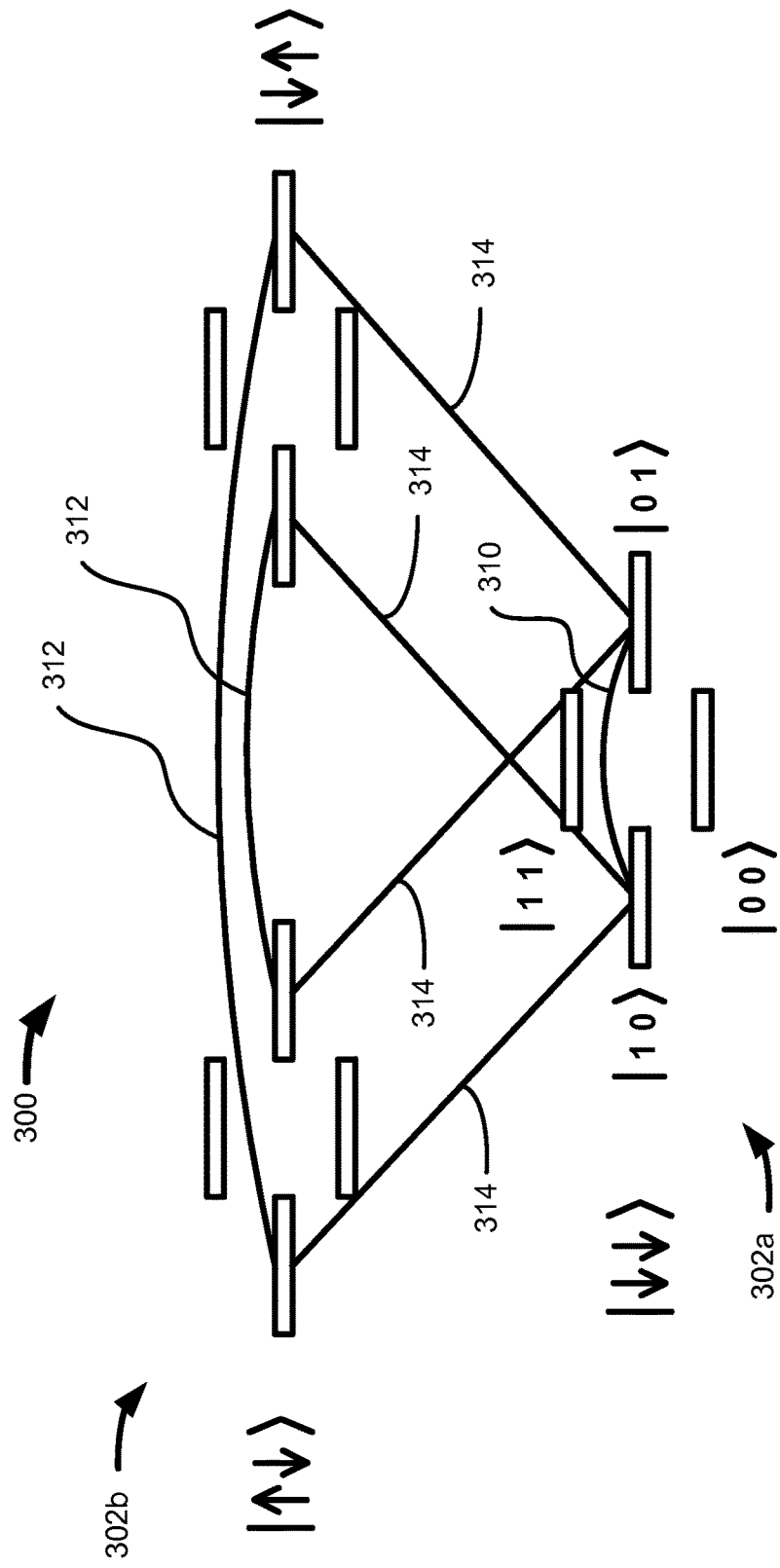
FIG. 3 is a schematic diagram showing energy levels for example nodes of a quantum information processor.

FIG. 3 is a schematic diagram 300 showing computational states for example nodes of a quantum information processor. The diagram 300 shows the energy state structure of an example 2×(1e-1n) system—a two-node system in which each processor node includes one electron actuator spin and one nuclear processor spin. The diagram 300 shows two manifolds of the quantum information processor. The actuator ground-state manifold 302a, denoted by the ket $|\downarrow\downarrow\rangle$, includes the nuclear spin states (denoted $|00\rangle$, $|01\rangle$, $|10\rangle$, and $|11\rangle$) where both actuators are in their respective ground states. In the notation used here, the electron ground states are represented as "$\downarrow$," the electron excited states are represented as "$\uparrow$," the nuclear ground states are represented as "0," and the nuclear excited states are represented as "1." The actuator zero-quantum manifold 302b includes the nuclear spin states where the actuators are in the zero-quantum state, denoted by kets $|\downarrow\uparrow\rangle$ and $|\uparrow\downarrow\rangle$.

In some implementations, quantum information can be encoded in the actuator ground-state manifold. For example, the computational basis states of the processor nodes can be defined in the actuator ground-state manifold 302a of the 2×(1e-1n) system shown in FIG. 3. This choice of encoding may allow gates between the processor nodes to be implemented by taking advantage of an induced cross-node coupling in the actuator zero-quantum manifold 302b. In the example shown in FIG. 3, the actuator zero-quantum manifold 302b represents the actuator excited states, which are not used for information storage. A desired cross-node transition 310 in the computational manifold can be achieved by moving an effective inter-node quantum coupling (corresponding to the transitions 312) in the actuator zero-quantum manifold 302b into an interaction frame of an applied microwave field (corresponding to the transitions 314) that mixes the two manifolds.

The form of a cross-node coupling represented, for example in the diagram 300 shown in FIG. 3, can be derived by considering the Hamiltonian of a general 2×(1e-kn) system with two identical nodes. The energy structure of this system includes a dominant, quantizing electron Zeeman interaction, $H_z^e$, with a strong static external field, $B_0\hat{z}$ oriented along the laboratory $\hat{z}$ direction; a nuclear Zeeman interaction $H_z^n$, with the same static field; an anisotropic hyperfine interaction between electron and nuclear spins, $H_{hf}^{e-n}$; and a dipolar interaction between electron spins, $H_D^{e-e}$. As such, the internal Hamiltonian of a 2×(1e-kn) node system can be represented in the lab frame as $$H^{2e-kn}=H_z^e+H_z^n+H_{hf}^{e-n}+H_D^{e-e}.$$

To simplify the discussion and isolate the dynamical evolution of interest, the dynamics can be described in an interaction frame of the electron Zeeman interactions, while considering only secular terms of the resulting Hamiltonians. In terms of the usual spin-½ Pauli operators, in the interaction frame of the electron Zeeman interactions:

$$\mathcal{H}_Z^n = \sum_k \omega_z^k(\sigma_z^{n1k} + \sigma_z^{n2k})$$

$$\mathcal{H}_{hf}^{e-n} = \sum_k \vec{A}^k \cdot (\sigma_z^{e1}\vec{\sigma}^{n1k} + \sigma_z^{e2}\vec{\sigma}^{n2k})$$

$$\mathcal{H}_D^{e-e} = \omega_d(2\sigma_z^{e1}\sigma_z^{e2} - \sigma_x^{e1}\sigma_x^{e2} - \sigma_y^{e1}\sigma_y^{e2}).$$

Here, the vectors $\vec{A}^k = A_x^k\hat{x} + A_y^k\hat{y} + A_z^k\hat{z}$ represent the strengths and directions of the hyperfine coupling between the $k^{th}$ nuclear spin in each node and the corresponding actuators, $\omega_z^k$ represents the strength of the nuclear Zeeman interaction for the $k^{th}$ nuclear spin, $\omega_d$ represents the strength of the dipolar interaction between electrons, and $\vec{\sigma} = \sigma_x\hat{x} + \sigma_y\hat{y} + \sigma_z\hat{z}$. In the equations above, $e_i$ represents the electron spin of the $i^{th}$ processor node, and $n_{ij}$ represents the $j^{th}$ nuclear spin of the $i^{th}$ processor node. (For illustration, this labeling of electron spins and nuclear spins is used in the examples shown in FIGS. 2 and 4.)

In some examples, the nuclear spins can be quantized in an effective field given by the vector sum of the anisotropic hyperfine and nuclear Zeeman interactions. The resulting eigenstates are non-commuting, which may allow for universal control of the nuclear spins via electron-only control. In some implementations, if the processor nodes are taken to be identical, the terms $H_{hf}^{e-n}$ and $H_D^{e-e}$ of the system Hamiltonian shown above do not provide the ability to selectively address nodes. Universal control over the entire 2×(1e-kn) system may be obtained, for example, by adding a term to the Hamiltonian that spatially labels the nodes to allow for local operations. These terms are not included in the present discussion as they are not necessary for the implementation of gates between nodes, and may be effectively turned off. The present discussion considers an example where the differences in the hyperfine coupling strengths within each node are large enough to be spectroscopically resolved, such that each pair of identical spins between nodes can be selectively addressed.

The full set of interactions accessible by evolution under the Hamiltonians $H_{hf}^{e-n}$ and $H_D^{e-e}$ may be derived according to the Lie algebra generated by taking Lie brackets to all orders. For example, given two Hamiltonians, A and B, the zeroth order Lie brackets are A and B, the first order Lie brackets are [A,B] and [B,A], and the second order brackets are [A,[A,B]], [A,[B,A]], [B,[A,B]], and [B,[B,A]]. Higher order brackets are generated by continuing the recursive pattern.

In the example 2×(1e-kn) electron-nuclear spin system described above, the second-order bracket, $$\left[\left[\mathcal{H}_D^{e-e}, \mathcal{H}_{hf}^{e-n}\right], \mathcal{H}_{hf}^{e-n}\right],$$

takes the form of a four-body cross-node coupling term. The four-body cross-node coupling is given by an effective cross-node nuclear spin dipolar coupling, $H_D^{n-n}$, along with flip-flop transitions of the electron spins:

$$[[H_D^{e-e}, H_{hf}^{e-n}] \propto \omega_d(\sigma_+^{e1}\sigma_-^{e2}+\sigma_-^{e1}\sigma_+^{e2}) \otimes H_D^{n-n}],$$

The resulting nuclear spin dynamics in the zero-quantum manifold can, in some cases, provide a complete coupling network between every cross-node pair of spins.

FIG. 4 is a schematic diagram 400 showing example cross-node quantum interactions between two nodes of a quantum information processor. The diagram 400 shows interactions in the zero-quantum manifold between a first node 402a and a second node 402b. The nuclear spin dynamics in the zero quantum manifold may be decomposed into terms $H_D^{lm}$ that act on a pair of spins, $n_{1l}$ and $n_{2m}$:

$$\mathcal{H}_D^{n-n} = \sum_{l,m=1}^{k} \mathcal{H}_D^{lm}$$

Each $H_D^{lm}$ may be written in terms of the well-known dipolar alphabet, $$\tilde{A}_{lm} = A_z^l A_z^m (\sigma_z^{n1l}\sigma_z^{n2m})$$

$$\tilde{B}_{lm} = (A_x^l A_x^m + A_y^l A_y^m)(\sigma_+^{n1l}\sigma_-^{n2m}+\sigma_-^{n1l}\sigma_+^{n2m}) + (A_x^l A_y^m - A_y^l A_x^m)(\sigma_+^{n1l}\sigma_-^{n2m}-\sigma_-^{n1l}\sigma_+^{n2m})$$

$$\tilde{C}_{lm} = (A_x^l A_z^m - iA_y^l A_z^m)(\sigma_+^{n1l}\sigma_z^{n2m}+\sigma_z^{n1l}\sigma_+^{n2m}) + (A_z^l A_x^m - A_z^l A_z^m - iA_z^l A_y^m + iA_y^l A_z^m)\sigma_z^{n1l}\sigma_+^{n2m}$$

$$\tilde{D}_{lm} = \tilde{C}_{lm}^*$$

$$\tilde{E}_{lm} = (A_x^l A_x^m - A_y^l A_y^m - iA_x^l A_y^m + iA_y^l A_x^m)\sigma_+^{n1l}\sigma_+^{n2m}$$

$$\tilde{F}_{lm} = \tilde{E}_{lm}^*$$

where $\sigma_\pm = \sigma_x \pm i\sigma_y$, and z* indicates the complex conjugate of z.

To move the induced interaction from the zero-quantum manifold to the computational manifold, a microwave control field of constant amplitude $\omega_1$, frequency $\omega_t$, and phase $\phi$, can be applied for a time t with Hamiltonian, $$H_{\mu w}(\omega_1, \omega_t, \phi, t) = \omega_1 e^{-i(\omega_t t+\phi)(\sigma_z e1+\sigma_z e2)/2} (\sigma_x^{e1}+\sigma_x^{e2}) e^{i(\omega_t t+\phi)(\sigma_z e1+\sigma_z e2)/2}$$

The values $\phi=0$ and $\omega_t=\omega_0^e$ are used here as an example; other suitable values may be used, as appropriate. The microwave Hamiltonian can induce transitions between energy levels differing by a single electron spin flip. As a result, the actuator ground-state manifold is connected to the zero-quantum manifold. The transitions 314 in the diagram 300 of FIG. 3 show an example of the microwave field connecting the actuator ground-state manifold 302a to the zero-quantum manifold 302b. In the example shown in FIG. 3, the connection between the two manifolds effectively creates a cross-node channel through which information may be transferred between the qubits of different processor nodes.

As such, the example cross-node interactions shown in FIG. 4 can be introduced by applying a microwave field to the actuators (i.e., the electrons $e_1$ and $e_2$). As an example, in the 2×(1e-1n) system represented in FIG. 3, the transitions 314 can be produced by applying a microwave field that corresponds to the Hamiltonian $H_{\mu w}(\omega_1, \omega_t, \phi, t)$ above. Evolution under the Hamiltonians $H_{hf}^{e-n}$ and $H_D^{e-e}$ appears as $H_D^{n-n}$, which induces the transitions 312 shown in FIG. 3. As such, to induce the cross-node transition 310 shown in FIG. 3 (between the computational basis states |01> and |10> in the actuator ground-state manifold), the information travels via the microwave transitions to the zero-quantum manifold, the information is swapped between nodes by the induced coupling in the zero-quantum manifold, and the swapped information travels back to the computational manifold via the microwave transitions.

An example operation that can be implemented by the induced cross-node channel is a parallel swap of the complete quantum states of the local processors. The parallel swap operation is an entangling operation, which is described here in the context of a spin-based architecture. The induced information transfer channels described here also have broader applicability to other types of operations, other computing architectures, and other system modalities. In the example described here, because information is not explicitly stored for an appreciable amount of time on the actuators, the channel may be implemented with little or no exposure to actuator decoherence. This feature may be particularly useful, for example, where the actuators are exposed to higher levels of noise than the processor elements, and possibly in other contexts. To perform the parallel swap operation, induced couplings between non-identical spins (l≠m) are suppressed while induced couplings between identical spin (l=m) are retained. This can be accomplished, for example, by exploiting the difference in symmetry between the pre-factors of the coupling operators for identical versus non-identical spins.

The 2×(1e-2n) system can be considered as an example. The effective Hamiltonians of the induced interactions may be written as $H_D^{\|}+H_D^x$, where $H_D^{\|}=H_D^{11}+H_D^{22}$. The effective dipolar coupling strength for $H_D^x$ appears as odd order in $\vec{A}^1$ and $\vec{A}^2$, while each term in $H_D^{\|}$ appears as even order. Thus, by inverting the state of only the second (or first) spin in each node halfway through free evolution under the induced Hamiltonians, a zeroth-order average Hamiltonian of only the desired $H_D^{\|}$ interactions can be generated. Higher order terms in the average Hamiltonian may be suppressed through the use of more sophisticated pulses or by applying the evolution-pulse-evolution cycle at a rate fast compared to $\omega_D$. In some example systems, the difference in hyperfine interaction strengths within each node are appreciably larger than the dipolar strength, $\omega_D$, which can provide spin selectability. This symmetry-based technique may be generalized to a larger number of nuclear spins per node. The generalization to larger numbers of spins may be implemented, for example, by a binomially expanding set of inversion pulses to properly select the desired couplings.

The desired components of the Hamiltonian (e.g., $\omega_d (\sigma_+^{e1}\sigma_-^{e2}+\sigma_-^{e1}\sigma_+^{e2}) \otimes H_D^{n-n}$ in the example above) may be isolated from other components (e.g., lower-order terms of the Lie algebra, higher-order terms of the Lie algebra, etc.) by any suitable technique. One example technique for suppressing the extraneous terms is to use a composite pulse sequence to generate an effective Hamiltonian for which the desired second order commutator is the dominant term. For example, the BCH expansion $$e^X e^Y = \exp\left(X+Y+\frac{1}{2}[X,Y]+\frac{1}{12}[X,[X,Y]]+\frac{1}{12}[Y,[Y,X]]\right)$$

can be used. An identity that suppresses all terms below second order can be derived by recursively applying this expansion:

$$e^X e^Y e^{-X} e^{-Y} e^{-X} e^Y e^X e^{-Y} = e^{[X,[X,Y]]+\ldots}$$

By making the correspondence $X=-i\tau H_{hf}^{e-n}$ and $Y=-i\tau H_D^{e-e}$, a pulse composed of sequential periods of only electron dipolar or hyperfine evolution can be composed, leading to the effective propagator, $$U(8\tau) \approx e^{i\tau 3[[\mathcal{H}_D^{e-e}, \mathcal{H}_{hf}^{e-n}]\mathcal{H}_{hf}^{e-n}]}$$

where higher-order terms have been omitted.

Undesired terms of the effective Hamiltonian may also be suppressed by employing advanced quantum control pulse techniques to numerically optimize or otherwise select microwave pulses which achieve the desired interaction while suppressing other interactions. Numerically optimized shaped pulses have been used extensively to control complex quantum systems. Such pulses may be designed to be robust to experimental variations of the system parameters.

The sensitivity of the induced channel to actuator noise processes may also be considered. In some instances, the cross-node quantum interaction can be accomplished without transferring complete qubit state information to the actuators. In such instances, the quantum information processor can operate in a regime where any portion of the information present in the bus manifold (e.g., the actuator zero-quantum manifold) arrives back to the protected computational manifold (e.g., the actuator ground-state manifold) before the information is corrupted.

Figure 5:
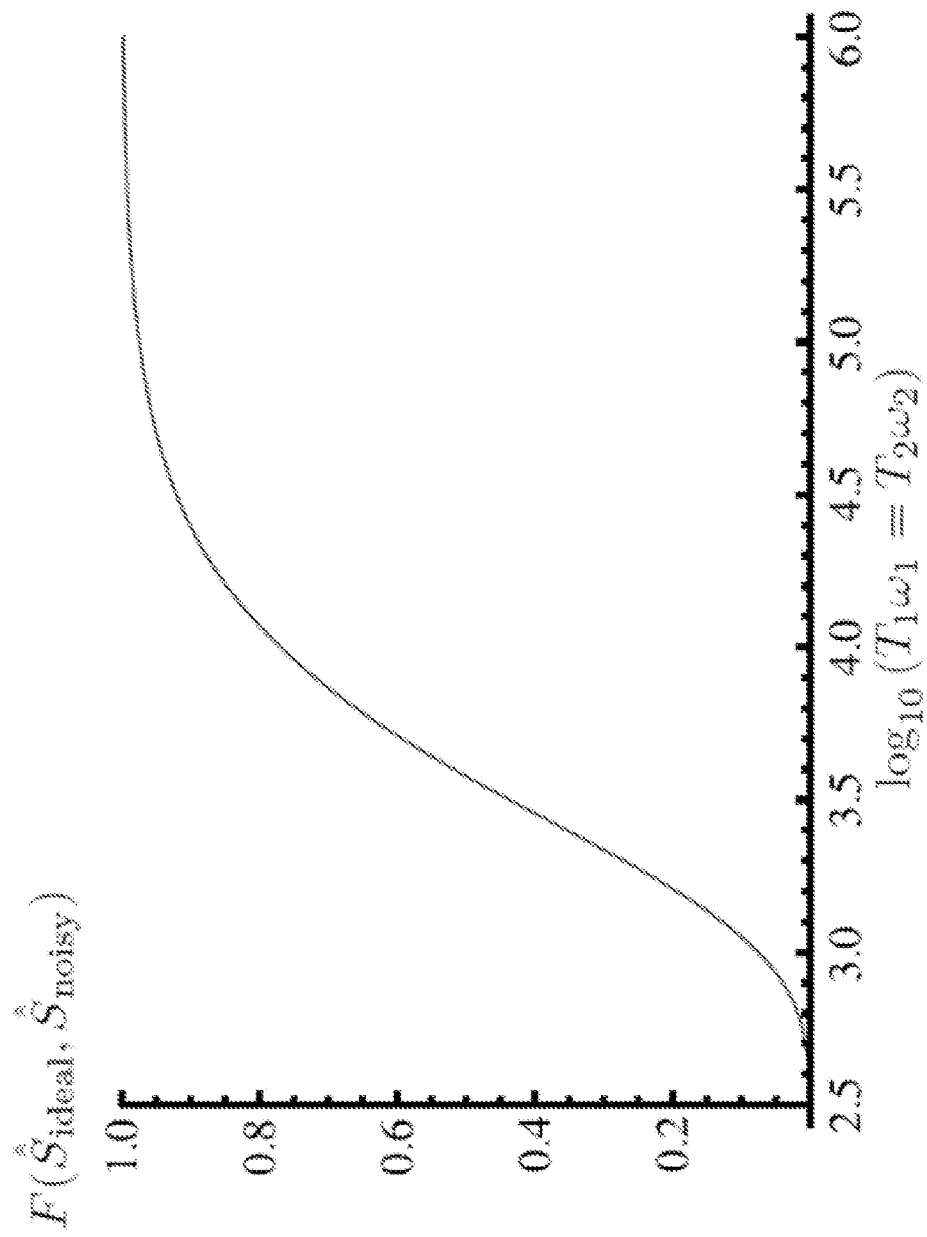
FIG. 5 is a plot showing numerically simulated superoperator fidelity versus noise strength in an example quantum information processor.

FIG. 5 is a plot showing numerically simulated superoperator fidelity versus noise strength in an example quantum information processor. The robustness of the cross-node channel to electron noise can be quantitatively evaluated by comparing, as a function of noise strength, the Hilbert-Schmidt inner product fidelity, $F(\hat{S}_{ideal}, \hat{S}_{noisy}) = \text{Tr}(\hat{S}_{ideal}^\dagger \hat{S}_{noisy})/d^2$ between $d^2$ dimensional superoperators representing the channel in the presence of electron noise, $\hat{S}_{noisy}$, and in the ideal noiseless case, $\hat{S}_{ideal}$. In this example, the ideal channel is generated by a Liouvillian operator, $\hat{L}$, corresponding to unitary evolution under the Hamiltonian $H=H^{2e-kn}+H_{\mu\nu}$. The noisy channel also includes two dissipation operators, $\hat{D}_1$ and $\hat{D}_2$, describing the relaxation of the actuators $e_1$ and $e_2$, respectively:

$$\hat{S}_{noisy}(t) = e^{-i\hat{L}t + \hat{D}_1 + \hat{D}_2}.$$

A physically motivated model of noise is a contribution of phase and amplitude damping applied separately to each electron, which leads to a dissipater, $$\hat{D} = -1/2 \, (\Gamma_1 + \Gamma_2)(E_- \otimes \mathbf{1} + \mathbf{1} \otimes E_-) + \Gamma_1 \sigma_+ \otimes \sigma_+ + \Gamma_2 E_- \otimes E_-$$

where $E_+ = |0\rangle\langle 0|$ and $E_- = |1\rangle\langle 1|$ are projection operators and $\mathbf{1} = |0\rangle\langle 0| + |1\rangle\langle 1|$ is the identity matrix. In this example, $\Gamma_{1,2}$ parameterize the noise strength, which is related to the commonly used energy, $T_1$, and coherence, $T_2$, relaxation times by $$\Gamma_1 = \frac{1}{T_1} \text{ and } \Gamma_1 = \frac{2T_1 - T_2}{T_1 T_2}$$

The plot 500 of the superoperator fidelity versus noise strength in FIG. 5 was numerically generated for the example case where $T_1=T_2$ and t is the appropriate time for implementing a SWAP gate. As shown in the plot 500, the noise has a minimal effect on the operation of the channel for values of $T_1\omega_1 \gtrsim 10^5$. In some example systems, for a modest Rabi frequency of 100 MHz, actuator relaxation times of milliseconds may help to avoid significant corruption of the information during transfer. In some instances, relaxation times for electron actuator spins are in the range of hundreds of milliseconds or higher.

Figure 6:
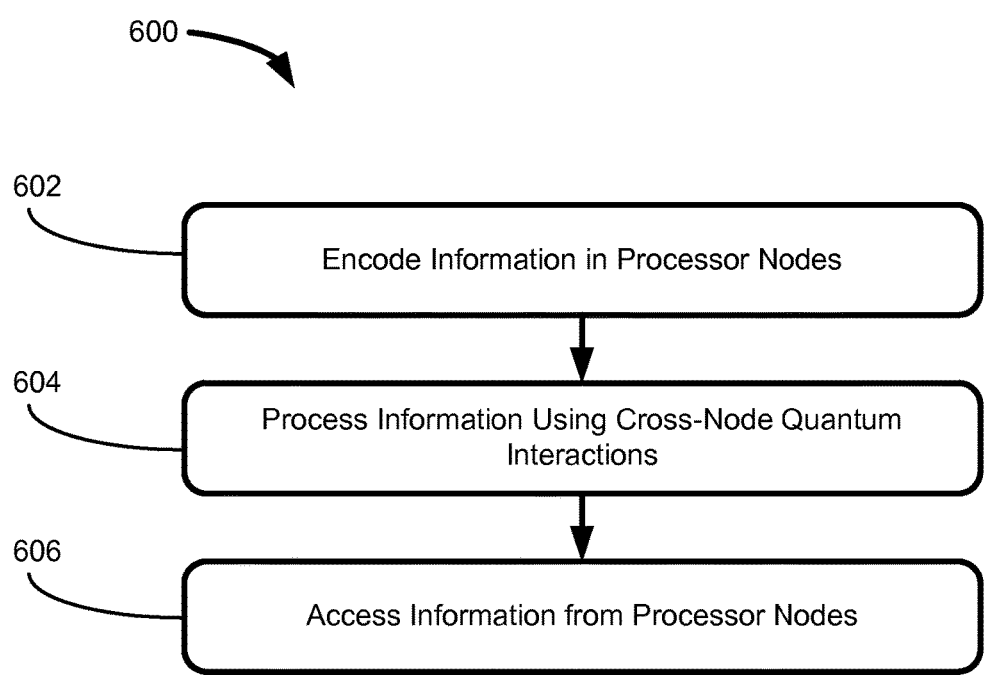
FIG. 6 is a flow chart showing an example quantum information processing technique.

FIG. 6 is a flow chart showing an example quantum information processing technique 600. The example technique 600 can be performed by any suitable system, device, or apparatus. In some implementations, the technique 600 can be implemented on a quantum information processor that includes a control system and multiple processing nodes. For example, the technique 600 may be executed by the quantum information processor 100 shown in FIG. 1A or by another type of system. In some instances, the control system can interface with processing nodes of the quantum information processor. For example, the processor nodes may each include one or more qubits and one or more actuators, and the control system may be operable to manipulate the quantum state of the qubits, the actuators, or both. The technique 600 may be implemented by other types of quantum computing systems.

Each of the processor nodes can have multiple basis states, which may define a Hilbert space. In some cases, the basis states of a processor node can be the eigenstates of the processor node system Hamiltonian. The basis states may be defined in a different manner, as appropriate. Some or all of the basis states may be used as computational basis states. In some instances, a decoherence-free subspace encoding may be used to define logical qubits in a subset of physical energy states which is unaffected by noise. For example, the encoding $|0\rangle_L=|01\rangle$, $|0\rangle_L=|10\rangle$ may be used to encode a single logical qubit in a subspace of two physical qubits robust to a noise Hamiltonian of the form $H_n=\omega(t)(\sigma_z^1+\sigma_z^2)$. In some instances, linear combinations of the processor node eigenstates may be used as computational basis states of the quantum information processor. For example, noiseless subsystem encodings may be used, where a subset of physical energy states are decomposed into a logical qubit space, L, on which the noise has no effect and a syndrome qubit space, Z, on which the noise acts. One such encoding of a single logical qubit into a subset of physical energy states of three physical qubits is:

$$|0\rangle_L \otimes |0\rangle_Z = \frac{1}{\sqrt{3}}(|001\rangle + \omega|010\rangle + \omega^2|100\rangle)$$

$$|1\rangle_L \otimes |0\rangle_Z = \frac{1}{\sqrt{3}}(|001\rangle + \omega^2|010\rangle + \omega|100\rangle)$$

$$|0\rangle_L \otimes |1\rangle_Z = \frac{1}{\sqrt{3}}(|110\rangle + \omega|101\rangle + \omega^2|011\rangle)$$

$$|1\rangle_L \otimes |1\rangle_Z = \frac{1}{\sqrt{3}}(|110\rangle + \omega^2|101\rangle + \omega|011\rangle),$$

where $$\omega = e^{-\frac{i2\pi}{3}}.$$

This example encoding is robust to collective noise about any arbitrary axis.

The actuator elements may define multiple manifolds of the quantum information processor. One or more of the manifolds can be used as the computational manifold of the quantum information processor. For example, the subset of qubit states in the actuator ground states can be used as the computational manifold. Other actuator states may be used as a computational manifold, as appropriate. One or more of the actuator manifolds can be used as a bus manifold of the quantum information processor. For example, the subset of qubit states in the actuator zero-quantum state can be used as the bus manifold. Other actuator states may be used as a bus manifold, as appropriate. For example, for more than two nodes, the subset of qubit states corresponding to single excitations of any actuator may be used as a bus manifold.

The computational manifold can include, for example, processor states in which information can be encoded or accessed by the control system, processor states where information can be stored in a manner that is less susceptible to system noise (e.g., decoherence), or any suitable combination of these and other processor states. The bus manifold can include processor states that are used to transfer information between the qubits of different processor nodes. The bus manifold can include a subset of processor states that are linked to the computational basis states by a particular operation of the control system.

For example, the bus manifold may be reached by applying an operation (e.g., a microwave pulse) to that moves the system into a particular interaction frame.

The example operations 602, 604, and 606 shown in FIG. 6 provide a high-level overview of an example technique 600 for quantum information processing. Additional or different techniques may be used in combination with, or as an alternative to, the technique 600 shown in FIG. 6. Moreover, the technique 600 can include additional or different sub-routines or operations that are not specifically shown in FIG. 6. In some implementations, one or more of the example operations shown in FIG. 6 can be repeated, iterated, or omitted, and the operations may be performed in the order shown or a different order, as appropriate.

At 602, information is encoded in the processor nodes of the quantum information processor. For example, the information can be encoded in the qubits of the processor nodes. Additionally or alternatively, the control system may interact with the processor nodes to perform one or more operations that encode information in the processor nodes. For example, the control system may cool, or otherwise extract energy from, the processor nodes to purify, or partially purify, the quantum state of the processor nodes. As another example, the control system may apply electromagnetic fields or pulses to the processor nodes to manipulate the states of the qubits, the actuators, or both. The frequency, phase, amplitude, or other properties of the applied electromagnetic fields can be configured to encode a particular state, based on the physical parameters of the processor nodes. The applied electromagnetic fields may include radio frequency pulses, microwave pulses, laser pulses, etc. The Hamiltonian of operations applied by the control system may be used alone, or in combination with the internal system Hamiltonian of the processor nodes, to encode information in the quantum information processor. Additional or different types of operations can be performed to encode information in the processor nodes.

At 604, the encoded information is processed. Processing the information encoded in the processor nodes may be accomplished, at least in part, by introducing cross-node quantum interactions. Processing the information encoded in the processor nodes may also include other types of operations, such as, for example, introducing intra-node quantum interactions between qubits, manipulating individual qubits, and other types of operations.

Generally, processing quantum information may include executing quantum algorithms, quantum gates, and other types of operations. Quantum algorithms can be used to represent computational tasks. Examples of well-known quantum algorithms include the quantum Fourier transform, Shor's factoring algorithm, Grover's search algorithm, algorithms for simulating quantum dynamics, algorithms for performing quantum error correction, and others.

Quantum algorithms can typically be expressed as a system, series, combination, or program of quantum gates. In some instances, a quantum algorithm can be expressed as a combination of single-qubit gates performed on a single qubit and multi-qubit gates performed on multiple qubits. Examples of single-qubit quantum gates include the Hadamard gate, the not gate, phase gates, and others. Examples of multi-qubit quantum gates include the controlled-not gate (which flips the quantum state of one qubit conditionally on the quantum state of another qubit), the swap gate (which swaps the quantum states of two qubits), the controlled phase gate (which applies a phase to the quantum state of one qubit conditionally on the quantum state of another qubit), and others. As a particular example, in the 2×(1e−1n) system represented in the diagram 300 in FIG. 3, a swap gate in the computational manifold maps the computational basis states |00>, |01>, |10>, and |11> to the computational basis states |00>, |10>, |01>, and |11>, respectively.

In some instances, a multi-qubit quantum gate can be executed completely or partially by introducing a quantum interaction between the qubits. When a multi-qubit quantum gate is to be performed on qubits of different processor nodes, cross-node quantum interactions can be used to execute all or part of the multi-qubit quantum gate. In some cases, cross-node quantum interactions between two processor nodes can be used to execute multiple multi- qubit quantum gates in parallel. As a particular example, a controlled-not gate may be applied to a first pair of qubits in two different processor nodes while a controlled-phase gate is applied to another pair of qubits in the same two processor nodes. As another example, swap gates may be concurrently applied to multiple pairs of qubits across the same two nodes. In some instances, multiple swap gates performed in parallel can be used to transfer the entire quantum state of a processor node to another processor node.

The control system may interact with the processor nodes to process information in the quantum information processor. As an example, the control system may apply electromagnetic fields or pulses to the processor nodes to manipulate the states of the qubits, the actuators, or both. The frequency, phase, amplitude, or other properties of the applied electromagnetic fields or pulses can be configured, based on the physical parameters of the processor nodes, to execute a particular quantum gate or a particular combination of quantum gates. The applied electromagnetic fields may include radio frequency pulses, microwave pulses, laser pulses, etc. The Hamiltonian of operations applied by the control system may be used alone, or in combination with the internal system Hamiltonian of the processor nodes, to process information in the quantum information processor.

In some examples, each of the k qubits in a given processor node are individually coupled to the actuator of the processor node by an intra-node quantum coupling. In some examples, the actuator of the $j^{th}$ processor node is coupled to the $i^{th}$ qubit in the $j^{th}$ processor node by a quantum coupling, which may be represented as a Hamiltonian $H^{a_j-q_{ji}}$. In addition, the actuators of different processor nodes may be coupled to each other by an inter-node quantum coupling. In some examples, the actuator of the $j^{th}$ processor node is coupled to the actuator of the $n^{th}$ processor node by a quantum coupling, which may be represented as a Hamiltonian $H^{a_j-a_n}$.

In some instances, for a given pair of qubits in different processor nodes, the inter-node quantum coupling between the actuators does not commute with the intra-node quantum couplings between the qubits and their respective actuators. For example, in the notation introduced above, two actuators $\alpha_1$ and $\alpha_2$ of different processor nodes may be coupled to each other by the inter-node Hamiltonian $H^{a_1-a_2}$, and the actuators may be coupled to one or more qubits $q_{1l}$ and $q_{2m}$ in their respective processor nodes by the intra-node Hamiltonians $H^{a_1-q_{1l}}$ and $H^{a_2-q_{2m}}$. In cases where the Hamiltonians $H^{a_1-q_{1l}}$, $H^{a_2-q_{2m}}$, and $H^{a_1-a_2}$ do not commute, the non-commutivity may give rise to four-body interaction terms among the actuators $\alpha_1$ and $\alpha_2$ and the qubits $q_{1l}$ and $q_{2m}$. In a particular interaction frame, the four-body terms may appear as a two-body interaction between the qubits $q_{1l}$ and $q_{2m}$. Accordingly, the control system of the quantum information processor may move the system into an interaction frame that produces an effective two-body interaction between the qubits $q_{1l}$ and $q_{2m}$ of two different nodes.

In some instances, the second order commutator $[[H^{a_1-a_2}, (H^{a_1-q_{1l}}+H^{a_2-q_{2m}})], (H^{a_1-q_{1l}}+H^{a_2-q_{2m}})]$ gives rise to an effective four-body cross-node interaction that can be expressed $H^{a_1-a_2} \otimes H^{q_{1l}-q_{2m}}$. A control sequence may be applied to the actuators to move the system into an interaction frame where the four-body term $H^{a_1-a_2} \otimes H^{q_{1l}-q_{2m}}$ appears as a two-body cross-node quantum interaction. In the interaction frame of the control sequence, the two body cross-node quantum interaction can be used to perform a two-qubit gate on the qubits $q_{1l}$ and $q_{2m}$ of two different nodes.

In terms of the example described above with respect to FIGS. 2 and 3, where the qubits are nuclear spins and the actuators are electron spins, the hyperfine interaction between the electron spins and the qubits does not commute with the dipolar interaction between electron spins. In particular, the second order commutator $$\left[\left[\mathcal{H}_D^{e-e}, \mathcal{H}_{hf}^{e-n}\right], \mathcal{H}_{hf}^{e-n}\right]$$

gives rise to four body terms $\omega_d(\sigma_+^{e_1}\sigma_-^{e_2}+\sigma_-^{e_1}\sigma_+^{e_2}) \otimes H_D^{n-n}$. By applying a sequence of microwave pulses to the electrons, the system can be moved into an interaction frame where the qubits of different processor nodes evolve under the effective dipolar interaction $H_D^{n-n}$. Other terms of the effective Hamiltonian can be suppressed by any suitable technique. For example, sequences of microwave pulses and delays, or numerically optimized shaped pulses can be engineered to effect the desired interaction.

Accordingly, the control system can introduce a cross-node quantum interaction between qubits of different processor nodes. The cross-node quantum interaction can be produced by the non-commutivity of intra-node quantum couplings and inter-node quantum couplings. An example of such non-commutivity is provided in the electron-nuclear spin modality by the second order commutator $$\left[\left[\mathcal{H}_D^{e-e}, \mathcal{H}_{hf}^{e-n}\right], \mathcal{H}_{hf}^{e-n}\right].$$

Other types of non-commuting inter-node and intra-node quantum couplings may be present in other types of quantum systems.

At 606, information is accessed from the processor nodes. The information may include information regarding the state of the qubits, the state of the actuators, or both. In some examples, the information is accessed by the control system interacting with the processor nodes. For example, the control system may acquire electromagnetic signals produced by the qubits, the actuators, or both. Additional or different types of signals may be acquired, as appropriate based on the physical properties of the processor nodes.

In some instances, the example technique 600 can be used to achieve efficient and robust information transfer in a node-based quantum information processing device. In some example node-based quantum information processors, each processor node includes a single electron and multiple nuclear spins, and the electron of each processor node is coupled by an anisotropic coupling Hamiltonian (an anisotropic hyperfine interaction) to the nuclear spins of the same processor node. The electrons of different processor nodes are coupled by an isotropic Heisenberg exchange interaction or an isotropic dipolar interaction. Information can be encoded in the processor states corresponding to the ground-state manifold of the electrons.

In such electron-nuclear spin systems and in other types of systems, the example technique 600 may be used to achieve noise-insensitive parallel transfer of quantum information between nuclear spins of different processor nodes. In some instances, the second commutator of the dipolar and hyperfine Hamiltonians contains a term that can simultaneously flip both actuator and qubits, and the simultaneous flip can be used to introduce quantum gates (e.g., a swap gate) between nodes.

In cases where the desired system dynamics arise in second (or higher) order, lower order terms of the system Hamiltonian can be suppressed by appropriate control techniques. Moreover, in some cases the computational basis states are in the actuator ground state manifold, and the desired system dynamics take place in the excited states of the actuator. In such instances, an appropriate control technique can be used to produce an interaction frame that connects the actuator ground state to the appropriate actuator excited states.

In some aspects, the technique 600 can be used to couple all qubits between nodes with strengths dependent on the hyperfine couplings strength. The hyperfine couplings may be selectively reduced, for example, by averaging sequences or other appropriate control techniques. As such, the cross-node channel can be composed for a variety of specific operations. Suitable control operations can be designed or selected to achieve any of these purposes. Some example control techniques include modulation sequences defined from composite pulses, optimal control theory, or other pulse-design techniques. Moreover, these techniques can be applied to physical implementations other than electron-nuclear spin systems.

While this specification contains many details, these should not be construed as limitations on the scope of the claims or of what may be claimed, but rather as descriptions of features of particular implementations. Certain features that are described in this specification in the context of separate embodiments can also be implemented in combination in a single embodiment. Moreover, various features that are described in the context of a single embodiment can be implemented in multiple embodiments separately or in any suitable subcombination.

Thus, a number of embodiments have been described. Nevertheless, it will be understood that various modifications may be made. Accordingly, other embodiments are within the scope of the following claims.

What is claimed is:

1. A quantum information processor comprising:
   a first processor node that includes a first plurality of qubits and a first actuator, the first plurality of qubits being coupled to the first actuator by respective intra-node quantum couplings in the first processor node;
   a second processor node that includes a second plurality of qubits and a second actuator, the second plurality of qubits being coupled to the second actuator by respective intra-node quantum couplings in the second processor node, the second actuator being coupled to the first actuator by an inter-node quantum coupling; and
   a control system operable to manipulate the first plurality of qubits and the second plurality of qubits based on cross-node quantum interactions between the first plurality of qubits and the second plurality of qubits, the cross-node quantum interactions being produced by non-commutivity of the inter-node quantum coupling and each intra-node quantum coupling in the first and second processor nodes;
   wherein the control system is operable to manipulate a first qubit in the first processor node and a second qubit in the second processor node by applying control operations to the actuators, and the control operations define an interaction frame in which the cross-node quantum interaction between the first qubit and the second qubit dominates the dynamics of the respective first and second qubits;
   wherein the intra-node quantum coupling $H_1$ between the first qubit and the first actuator commutes with the intra-node quantum coupling $H_2$ between the second qubit and the second actuator, and the control system is operable to induce the cross-node quantum interaction from an effective coupling term $[[H_3, (H_1+H_2)], (H_1+H_2)]$, where $H_3$ represents the inter-node quantum coupling.

2. The quantum information processor of claim 1, wherein the control system is operable to induce multiple cross-node quantum interactions concurrently.

3. The quantum information processor of claim 1, wherein the control system is operable to suppress other interactions of the respective first and second qubits.

4. The quantum information processor of claim 1, wherein the inter-node quantum coupling includes a dipolar coupling or exchange coupling between the first actuator and the second actuator.

5. The quantum information processor of claim 4, wherein the intra-node quantum couplings in the first processor node include a first hyperfine coupling between the first qubit and the first actuator, the intra-node quantum couplings in the second processor node include a second hyperfine coupling between the second qubit and the second actuator, and the cross-node quantum interactions include an effective dipolar interaction or exchange interaction between the first qubit and the second qubit in an interaction frame.

6. The quantum information processor of claim 1, wherein the first plurality of qubits includes a first plurality of nuclear spins, the second plurality of qubits includes a second plurality of nuclear spins, the first actuator includes a first electron, and the second actuator includes a second electron.

7. The quantum information processor of claim 6, wherein the control system is operable to apply a microwave field to the first and second electrons to induce the cross-node quantum interaction that manipulates the first and second plurality of qubits.

8. The quantum information processor of claim 6, wherein the control system is operable to apply a microwave field to the first and second electrons that suppresses other quantum interactions between the first processor node and the second processor node.

9. The quantum information processor of claim 1, wherein the first actuator is the only actuator of the first processor node and the second actuator is the only actuator of the second processor node.

10. The quantum information processor of claim 1, wherein the cross-node quantum interactions between the first plurality of qubits and the second plurality of qubits are robust to noise acting on the respective first and second actuators.

11. A quantum information processing method comprising:
    encoding information in a first processor node and a second processor node, the first processor node includes a first plurality of qubits and a first actuator, the first plurality of qubits being coupled to the first actuator by respective intra-node quantum couplings in the first processor node, the second processor node includes a second plurality of qubits and a second actuator, the second qubit being coupled to the second actuator by respective intra-node quantum couplings in the second processor node, the second actuator being coupled to the first actuator by an inter-node quantum coupling; and
    processing the information using cross-node quantum interactions between the first plurality of qubits and the second plurality of qubits, the cross-node quantum interactions being produced by non-commutivity of the inter-node quantum coupling and each intra-node quantum coupling in the first and second processor nodes, wherein processing the information includes performing a multi-qubit quantum gate on a first qubit in the first processor node and a second qubit in the second processor node.;
    wherein processing the information includes applying control operations to the first and second processor nodes, and the control operations define an interaction frame in which the cross-node quantum interaction between the first qubit and the second qubit dominates the dynamics of the respective first and second qubits;
    wherein the intra-node quantum coupling $H_1$ between the first qubit and the first actuator commutes with the intra-node quantum coupling $H_2$ between the second qubit and the second actuator, and the cross-node quantum interaction is induced from an effective coupling term $[[H_3, (H_1+H_2)], (H_1+H_2)]$, where $H_3$ represents the inter-node quantum coupling.

12. The method of claim 11, wherein the control operations include an electromagnetic field applied to the first and second actuators.

13. The method of claim 11, further comprising detecting a result of the processing.

14. The method of claim 11, wherein the cross-node quantum interactions between the first plurality of qubits and the second plurality of qubits are robust to noise acting on the respective first and second actuators.

15. A quantum information processor comprising:
a node system comprising a plurality of processor nodes, each of the processor nodes includes a plurality of qubits and an actuator; and
a control system operable to perform a multi-qubit quantum gate based on a cross-node quantum interaction between the qubits of different processor nodes, wherein the cross-node quantum interaction between the qubits of different processor nodes are produced by non-commutivity of:
  intra-node quantum couplings between the plurality of qubits and the respective actuator of each processor node; and
  inter-node quantum couplings between the actuators of the different nodess;
wherein the control system is operable to manipulate a first qubit in the first processor node and a second qubit in the second processor node by applying control operations to the actuators, and the control operations define an interaction frame in which the cross-node quantum interaction between the first qubit and the second qubit dominates the dynamics of the respective first and second qubits;
wherein the intra-node quantum coupling $H_1$ between the first qubit and the first actuator commutes with the intra-node quantum coupling $H_2$ between the second qubit and the second actuator, and the control system is operable to induce the cross-node quantum interaction from an effective coupling term $[[H_3, (H_1+H_2)], (H_1+H_2)]$, where $H_3$ represents the inter-node quantum coupling.

16. The quantum information processor of claim 15, wherein the control system is operable to perform a universal set of quantum gates based on cross-node quantum interactions between the qubits of different processor nodes.

17. The quantum information processor of claim 16, wherein the control system is operable to produce an effective interaction between each qubit in a given node to each qubit in an adjacent node for all inter-node pairs of qubits.

18. The quantum information processor of claim 17, wherein the control system is operable to produce the effective interactions for all cross-node pairs of qubits in parallel.

19. The quantum information processor of claim 18, wherein the control system is operable to produce the effective interactions for each cross-node pairs individually.

20. The quantum information processor of claim 15, wherein the control system is operable to perform a quantum algorithm that includes the multi-qubit quantum gate and other operations.

21. The quantum information processor of claim 20, wherein the control system is operable to:
  encode information in a quantum state of the qubits; and
  detect information encoded in a quantum state of the qubits.

22. The quantum information processor of claim 20, wherein the control system is operable to perform the multi-qubit quantum gate by modulating only the actuators.

23. The quantum information processor of claim 15, wherein the actuators define a plurality of manifolds, the plurality of manifolds includes a computational manifold that defines computational states of the qubits.

24. The quantum information processor of claim 23, wherein the computational manifold includes one or more ground states of the actuators, the cross-node quantum interaction is induced by an excited state of the actuators, and the control system is operable to perform the multi-qubit quantum gate by generating a transition between the ground state and the excited state.

* * * * *

UNITED STATES PATENT AND TRADEMARK OFFICE
CERTIFICATE OF CORRECTION

PATENT NO. : 9,663,358 B1
APPLICATION NO. : 13/533390
DATED : May 30, 2017
INVENTOR(S) : David G. Cory, Troy W. Bornman and Christopher E. Granade It is certified that error appears in the above-identified patent and that said Letters Patent is hereby corrected as shown below:

On the Title Page

Page 2, Column 1, Line 5, Other Publications:
Delete "Harnett," and insert -- Harneit, -- therefor.

Page 2, Column 1, Line 13, Other Publications:
Delete "three-quibit" and insert -- three-qubit -- therefor.

Page 2, Column 2, Line 10, Other Publications:
Delete "quibits," and insert -- qubits, -- therefor.

Page 2, Column 2, Line 16, Other Publications:
Delete "L.," and insert -- al., -- therefor.

Page 2, Column 2, Line 48, Other Publications:
Delete "Nucelar" and insert -- Nuclear -- therefor.
Delete "Univeristy" and insert -- University -- therefor.

In the Specification

Column 6, Line 8, Detailed Description:
Delete "cross- node" and insert -- cross-node -- therefor.

Column 8, Lines 23-1, Detailed Description:
Delete "112a, 110a s yf 112b, 110a $_{and}$ yr 112c, 110as represented" and insert -- represented -- therefor.

Column 9, Lines 63 and 64, Detailed Description:
Delete "112a, 110a ₃l'110a, 110b$_{and}$ ₃l412d,110b Hamiltonians," and
insert -- Hamiltonians $\mathcal{H}^{112a, 110a}$, $\mathcal{H}^{110a, 110b}$, and $\mathcal{H}^{112d, 110b}$ -- therefor.

Signed and Sealed this
Thirty-first Day of July, 2018

Andrei Iancu
*Director of the United States Patent and Trademark Office*

CERTIFICATE OF CORRECTION (continued)
U.S. Pat. No. 9,663,358 B1

Column 13, Lines 5-7, Detailed Description:

Delete "$[[H_D{}^{e-e}, H_{hf}{}^{e-n}], H_{hf}{}^{e-n}] \propto \omega_d(\sigma_+{}^{e1}\sigma_-{}^{e2} + \sigma_-{}^{e1}\sigma_+{}^{e2}) \otimes H_D{}^{n-n}$" and insert -- $[[\mathcal{H}_D^{e\text{-}e}, \mathcal{H}_{hf}^{e\text{-}n}], \mathcal{H}_{hf}^{e\text{-}n}] \propto \omega_d(\sigma_+^{e_1}\sigma_-^{e_2} + \sigma_-^{e_1}\sigma_+^{e_2}) \otimes \mathcal{H}_D^{n\text{-}n}$ -- therefor.

Column 13, Lines 26-33, Detailed Description:

Delete "
$$\tilde{A}_{\ell m} = A_z^\ell A_z^m \left(\sigma_z^{n_1\ell}\sigma_z^{n_2m}\right)$$

$$\tilde{B}_{\ell m} = \left(A_x^\ell A_x^m + A_y^\ell A_y^m\right)\left(\sigma_+^{n_1\ell}\sigma_-^{n_2m} + \sigma_-^{n_1\ell}\sigma_+^{n_2m}\right)$$
$$+ \left(A_x^\ell A_x^m - A_y^\ell A_y^m\right)\left(\sigma_+^{n_1\ell}\sigma_-^{n_2m} - \sigma_-^{n_1\ell}\sigma_+^{n_2m}\right)$$

$$\tilde{C}_{\ell m} = \left(A_x^\ell A_z^m - iA_y^\ell A_z^m\right)\left(\sigma_+^{n_1\ell}\sigma_z^{n_2m} + \sigma_z^{n_1\ell}\sigma_+^{n_2m}\right)$$
$$+ \left(A_z^\ell A_x^m - A_z^\ell A_z^m - iA_z^\ell A_y^m + iA_y^\ell A_z^m\right)\sigma_z^{n_1\ell}\sigma_+^{n_2m}$$
" and insert --
$$\tilde{A}_{\ell m} = A_z^\ell A_z^m \left(\sigma_z^{n_1\ell}\sigma_z^{n_2m}\right)$$

$$\tilde{B}_{\ell m} = \left(A_x^\ell A_x^m + A_y^\ell A_y^m\right)\left(\sigma_+^{n_1\ell}\sigma_-^{n_2m} + \sigma_-^{n_1\ell}\sigma_+^{n_2m}\right)$$
$$+ \left(A_x^\ell A_x^m - A_y^\ell A_y^m\right)\left(\sigma_+^{n_1\ell}\sigma_-^{n_2m} - \sigma_-^{n_1\ell}\sigma_+^{n_2m}\right)$$

$$\tilde{C}_{\ell m} = \left(A_x^\ell A_z^m - iA_y^\ell A_z^m\right)\left(\sigma_+^{n_1\ell}\sigma_z^{n_2m} + \sigma_z^{n_1\ell}\sigma_+^{n_2m}\right)$$
$$+ \left(A_z^\ell A_x^m - A_z^\ell A_z^m - iA_z^\ell A_y^m + iA_y^\ell A_z^m\right)\sigma_z^{n_1\ell}\sigma_+^{n_2m}$$
-- therefor.

Column 13, Line 35, Detailed Description:

Delete "$\tilde{E}_{\ell m} = \left(A_x^\ell A_x^m - A_y^\ell A_y^m - iA_x^\ell A_y^m + iA_y^\ell A_x^m\right)\sigma_+^{n_1\ell}\sigma_+^{n_2m}$" and insert -- $\tilde{E}_{\ell m} = \left(A_x^\ell A_x^m - A_y^\ell A_y^m - iA_x^\ell A_y^m + iA_y^\ell A_x^m\right)\sigma_+^{n_1\ell}\sigma_+^{n_2m}$ -- therefor.

CERTIFICATE OF CORRECTION (continued)
U.S. Pat. No. 9,663,358 B1

Column 13, Line 44-46, Detailed Description:

Delete "$\mathcal{H}_{\mu w}(\omega_1, \omega_t, \phi, t) = \omega_1 e^{-i(\omega_t t+\phi)(\sigma_z^{e_1}+\sigma_z^{e_2})/2} \cdot (\sigma_x^{e_1} + \sigma_x^{e_2}) e^{i(\omega_t t+\phi)(\sigma_z^{e_1}+\sigma_z^{e_2})/2}$" and insert -- $\mathcal{H}_{\mu w}(\omega_1, \omega_t, \phi, t) = \omega_1 e^{-i(\omega_t t+\phi)(\sigma_z^{e_1}+\sigma_z^{e_2})/2} \cdot (\sigma_x^{e_1} + \sigma_x^{e_2}) e^{i(\omega_t t+\phi)(\sigma_z^{e_1}+\sigma_z^{e_2})/2}$ -- therefor.

In Column 15, Lines 3-40, Detailed Description:

Delete "$F(\hat{\hat{S}}_{ideal}, \hat{\hat{S}}_{noisy}) = \text{Tr}(\hat{\hat{S}}_{ideal}^{\dagger} \hat{\hat{S}}_{noisy})/d^2$" and insert -- $F(\hat{\hat{S}}_{ideal}, \hat{\hat{S}}_{noisy}) = \text{Tr}(\hat{\hat{S}}_{ideal}^{\dagger} \hat{\hat{S}}_{noisy})/d^2$ -- therefor.

Column 15, Line 41, Detailed Description:

Delete "$\hat{\hat{S}}_{noisy}$" and insert -- $\hat{\hat{S}}_{noisy}$ -- therefor.

Column 15, Line 42, Detailed Description:

Delete "$\hat{\hat{S}}_{ideal}$" and insert -- $\hat{\hat{S}}_{ideal}$ -- therefor.

Column 15, Lines 3-50, Detailed Description:

Delete "$\hat{\hat{S}}_{noisy}(t) = e^{-it\hat{L}+t\hat{D}_1+t\hat{D}_2}$" and insert -- $\hat{\hat{S}}_{noisy}(t) = e^{-it\hat{L}+t\hat{D}_1+t\hat{D}_2}$ -- therefor.

Column 15, Lines 54-56, Detailed Description:

Delete "$\hat{\hat{D}} = -1/2 \quad (\Gamma_1+\Gamma_2)(E_- \otimes \mathbf{1} + \mathbf{1} \otimes E_-) + \Gamma_1 \sigma_+ \otimes \sigma_+ + \Gamma_2 E_- \otimes E_-$" and insert -- $\hat{\hat{D}} = -\frac{1}{2}(\Gamma_1 + \Gamma_2)(E_- \otimes \mathbf{1} + \mathbf{1} \otimes E_-) + \Gamma_1 \sigma_+ \otimes \sigma_+ + \Gamma_2 E_- \otimes E_-$ -- therefor.

In the Claims

Column 22, Line 45, Claim 11:
Delete "node.;" and insert -- node; -- therefor.

Column 23, Line 15, Claim 15:
Delete "nodess;" and insert -- nodes, -- therefor.